US012783661B2

(12) United States Patent
Hayes

(10) Patent No.: US 12,783,661 B2
(45) Date of Patent: Nov. 3, 2026

(54) DATA TAMPERING DEFENSE SYSTEM

(71) Applicant: John William Hayes, Clearwater, FL (US)

(72) Inventor: John William Hayes, Clearwater, FL (US)

(73) Assignee: Caladesi Technology, Inc., Sarasota, FL (US)

( * ) Notice: Subject to any disclaimer, the term of this patent is extended or adjusted under 35 U.S.C. 154(b) by 50 days.

(21) Appl. No.: 18/394,089

(22) Filed: Dec. 22, 2023

(65) Prior Publication Data

US 2025/0209165 A1 Jun. 26, 2025

(51) Int. Cl.
*G06F 21/56* (2013.01)
*G06F 21/55* (2013.01)

(52) U.S. Cl.
CPC .......... *G06F 21/564* (2013.01); *G06F 21/554* (2013.01)

(58) Field of Classification Search
CPC ............................ G06F 21/564; G06F 21/554
See application file for complete search history.

(56) References Cited

U.S. PATENT DOCUMENTS

2006/0287607 A1* 12/2006 Sackellares .......... G05B 23/024 600/544
2016/0354024 A1* 12/2016 Keshava ................ A61B 5/164
2017/0085585 A1* 3/2017 Morkovský ........... G06F 21/316
2020/0387609 A1* 12/2020 Hansen ................. G06F 21/552
2022/0417261 A1* 12/2022 Rashidi ................. G06F 16/245
2023/0289443 A1* 9/2023 Sinha .................... G06F 11/004
2023/0394144 A1* 12/2023 Boll ....................... G06N 3/045
2024/0134975 A1* 4/2024 Saxe ...................... G06N 5/025
2025/0005151 A1* 1/2025 Parmar ................. G06F 21/561

OTHER PUBLICATIONS

Back Determining the Number of Samples Required to Estimate Entropy in Natural Sequences School of ITEE, The University of Queensland, Brisbane, QLD, 4072 Australia; May 23, 1980.
Davies Comparison of Entropy Calculation Methods for Ransomware Encrypted File Identification Simon R. Davies, Richard Macfarlane and William J. Buchanan Entropy 2022, 24, 150.

(Continued)

*Primary Examiner* — Chau Le
*Assistant Examiner* — Kamryn J Gillespie
(74) *Attorney, Agent, or Firm* — Thomas Nello Giaccherini

(57) ABSTRACT

Apparatus and methods for detecting and thwarting ransomware attacks are disclosed. Target data (11) is read from a repository of data (12). An order measurement sensor (14) calculates a number of measurements of order (16) of the target data (11). Each measurement of order (16) is calculated from an EnFret (40) which describes the portion of the target data (11) to use. A comparator (18) compares the measurement of order (14) with a plurality of pre-determined levels of order (22P) retrieved from a library (20). If the comparator (18) determines that at least one of these measurements of order (16) falls outside of the plurality of range of order (23P), then an indicator (24) indicates that an anomalous measurement of order (16) has been made. An anomalous measurement of order indicates that the target data (11) is tampered with and encrypted.

49 Claims, 16 Drawing Sheets

(56) References Cited

OTHER PUBLICATIONS

De Olivera A Note on the Shannon Entropy of Short Sequences H. M. de Oliveira and Raydonal Ospina Statistics Department, Federal University of Pernambuco Jul. 7, 2018.
Delgado-Bonai Approximate Entropy and Sample Entropy: A Comprehensive Tutorial Alfonso Delgado-Bonal and Alexander Marshak NASA Goddard Space Flight Center, Greenbelt, MD, May 28, 2019.
Rojas Improving randomness characterization through Bayesian model selection Rafael Diaz Hernandez Rojas', Aldo Solis', Ali M. Angulo Martinez', Alfred B. U'Ren', Jorge G. Hi, Jun. 8, 2017.
Rukhin A Statistical Test Suite for Random and Pseudorandom No. Generators for Cryptographic Applications Andrew Rukhin, Juan Soto, James Nechvatal, Miles Smid, Elaine Ba, Apr. 2010.
Shannon A Mathematical Theory of Communication C. E. Shannon The Bell System Technical Journal, vol. 27, pp. 379-423, 623-656, Jul. Oct. 1948.
Souri A state-of-the-art survey of malware detection approaches using data mining techniques Alireza Souri and Rahil Hosseini Hum. Cent. Comput. Inf. Sci. (2018) 8:3 https:/, 2018.

* cited by examiner

PRIOR ART

PRIOR ART

DATA TAMPERING DEFENSE SYSTEM

CROSS-REFERENCE TO RELATED PENDING U.S. PATENT APPLICATION & CLAIM FOR PRIORITY

None.

FEDERALLY SPONSORED RESEARCH OR DEVELOPMENT

None.

FIELD OF THE INVENTION

The present disclosure relates to the security of electronic devices, computers and networks, and to the detection of unauthorized tampering and encryption of data. More particularly, one embodiment of the present disclosure pertains to a method for generating order measurements to detect malware performing the unauthorized encryption of a file.

BACKGROUND OF THE INVENTION

Ransomware is malicious software that extorts funds from organizations by holding their computer files for ransom. Ransomware operates by encrypting computer files making them unavailable to the file owners until the ransom has been paid. Many ransomware attacks are transnational coming from countries that provide safe havens to the criminals operating the ransomware software. Ransoms are often demanded in Bitcoin or other crypto currency, making tracing and prosecuting the perpetrators difficult. A ransomware attack in May of 2021 temporarily crippled a major U.S. gasoline pipeline operator, causing fuel shortages and price spikes. Other ransomware attacks have affected schools, hospitals and government agencies. In each successful attack, the victim was unable to operate their computer systems. Even after paying the ransom, some of the affected systems could not be brought back online.

In 2021, Cloudwards published a report claiming that ransomware cost the world $20 Billion dollars in 2021. That number is expected to rise to $265 Billion in costs by 2031. A technology that can detect and block ransomware from tampering with data would have a tremendous impact in reducing these costs.

There have been a number of approaches to protecting computer systems from ransomware attacks. Many of these approaches rely on the detection of ransomware software that has been previously detected on other computer systems. While this stops some ransomware attacks, it is susceptible to zero-day attacks. Zero-day attacks are attacks from a previously unknown malware or variant. Another approach that attempts to address zero-day attacks operates by analyzing software operating behavior. Behavioral malware detection can be evaded and may cause an increase in detection false positives. A false positive is when the presence of malware is falsely detected, such as when a burglar alarm goes off because of an animal. In additional to false positives, there are also false negatives. A false negative is when the detection should have detected an event and fails to do so. A false negative for a burglar alarm is when a burglar breaks into a home and the alarm fails to go off. The concepts of false positives and false negatives are especially important when detecting malware and ransomware. The rate of false positives can be seem as a measure of deployability. If ransomware is falsely detected too frequently, the alerts may get ignored-like the little boy who cried wolf. Operationally, detection mechanisms that generate a high number of false positives are generally only used for alerting and are not used to block the suspect activity. Only when the number of false positives is low enough is automatic blocking of suspicious activity generally acceptable. On the otherside, false negatives can be though of as a measurement of effectiveness. A detection mechanism with a high number of false negatives is not providing very good protection. The challenge is how to detect zero-day ransomware attacks with both a low false positive rate and a low false negative rate.

Another approach to combating ransomware relies on filesystem permissions. This approach attempts to make file unwritable so that those files cannot be encrypted. While good in concept, this approach is often difficult to implement due to the operational requirements of legacy software.

A system which can reliably detect and block ransomware, which detects zero-day attacks with a low false positive rate and a low false negative rate, and which can be easily and reliable deployed to legacy software and systems, would constitute a major technological advance, and would satisfy long felt needs and aspirations in the computer security industry.

SUMMARY OF THE INVENTION

When a computer, electronic device, or network is attacked by ransomware, data stored on the computer, electronic device, or network may be encrypted without the permission of the owner. Unless the ransom is paid, the data becomes inaccessible by the owner of the computer, electronic device or network, because the owner does not possess the key necessary to de-crypt the data. The attacker holds the owner's data as a hostage, and tries to obtain a payment from the owner in exchange for the key that would enable the owner to re-capture control of his or her data.

One embodiment of the present disclosure senses when a ransomware attack is in progress. One component of the present disclosure generally constantly monitors the data stored in the computer, electronic device or network. At any given time, an arrangement of data possesses an attribute called "entropy." This attribute is related to the relative order or dis-order of the arrangement of the stored data. When a ransomware attack is in progress, the entropy of the arrangement of data changes. The present disclosure detects this change, and places the encrypted data in quarantine.

The present disclosure may also produce an indication or an alarm which alerts that a ransomware attack is under way. One embodiment may also disconnect the computer, electronic device or network from the connection that is being used by the ransomware attacker. This disconnection may by physical or logical. A logical disconnection prevents the ransomware from communicating with the computer, electronic device or network under attack, even if the ransomware is physically present on the computer, electronic device or network.

This approach is quite different from conventional ransomware detection methodologies. In conventional ransomware detection, memory and filesystem scanners look for indicators or signatures of previously seen ransomware. This approach is focused on the executable programs that perform the ransomware activities, including the encryption of data. The present disclosure detects changes in characteristics of the data to detect the unauthorized encryption that is ransomeware. By focusing on the data transformation, this approach operates independently from the executable programs that perform the ransomware activities, and is therefore able to detect and block zero-day ransomware.

Description and Example of Measurement of Order

FIG. 1 shows images of playing cards arranged in order from 2 through A. We assign a number corresponding to each playing card as the value of the card, where Jack=11, Queen=12, King=13, A=14.

Then, following the process of:

(1) Calculate the difference in the numbers of adjacent cards. If that difference is negative, add 13 to make it positive.

(2) Count how many of the differences are 1, 2, 3, and so on.

(3) Divide the count in each bucket by 12 to turn the counts into probabilities.

(4) Add up the probability times the log of the probability for each bucket that had a non-zero count.

(5) Take the number in (4) and multiply by −1, that's the Shannon Entropy.

Performing the steps above for FIG. 1 we get:

Card Ordering: 2, 3, 4, 5, 6, 7, 8, 9, 10, J, Q, K, A

| Card Pair | Value |
|---|---|
| 2-3 | −1 + 13 = 12 |
| 3-4 | −1 + 13 = 12 |
| 4-5 | −1 + 13 = 12 |
| 5-6 | −1 + 13 = 12 |
| 6-7 | −1 + 13 = 12 |
| 7-8 | −1 + 13 = 12 |
| 8-9 | −1 + 13 = 12 |
| 9-10 | −1 + 13 = 12 |
| 10-J | −1 + 13 = 12 |
| J-Q | −1 + 13 = 12 |
| Q-K | −1 + 13 = 12 |
| K-A | −1 + 13 = 12 |

Resulting buckets of differences

| Bucket | Count | Count/12 (Prob) | prob * log(prob) |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 12 | 1 | 0 |
| Sum | | | 0 |

The sum of all prob * log(prob) is 0. Multiplying by −1 results in 0. This is perfect order. This is the result of the Shannon Entropy calculation of the cards shown in FIG. 1.

FIG. 2 shows images of playing cards arranged with 2 of the cards out of the order of 2 through A. If we repeat the process of calculating the numerical difference between each pair of cards in order beginning with 2-3, we get the following set of values:

Card Ordering: 8, 3, 4, 5, 6, 7, 2, 9, 10, J, Q, K, A

| Card Pair | Value |
|---|---|
| 8-3 | 5 |
| 3-4 | −1 + 13 = 12 |
| 4-5 | −1 + 13 = 12 |
| 5-6 | −1 + 13 = 12 |
| 6-7 | −1 + 13 = 12 |
| 7-2 | 5 |
| 2-9 | −7 + 13 = 6 |
| 9-10 | −1 + 13 = 12 |
| 10-J | −1 + 13 = 12 |
| J-Q | −1 + 13 = 12 |
| Q-K | −1 + 13 = 12 |
| K-A | −1 + 13 = 12 |

Resulting buckets of differences

| Bucket | Count | Count/12 (Prob) | prob * log(prob) |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 2 | 0.16667 | −0.1297 |
| 6 | 1 | 0.08334 | −0.0899 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 9 | 0.75 | −0.0937 |
| Sum | | | −0.3133 |

The sum of all prob * log(prob) is −0.3133. Multiplying by −1 results in 0.3133. This shows a small amount of disorder. This is the result of the Shannon Entropy calculation of the cards shown in FIG. 2.

FIG. 3 shows images of playing cards arranged with 12 of the 13 cards out of the order of 2 through A. If we repeat the process of calculating the numerical difference between each pair of cards in order beginning with 2-3, we get the following set of values:

Card Ordering: 8, 4, 3, 9, 7, 6, 2, 5, 10, A, K, Q, J

| Card Pair | Value |
|---|---|
| 8-4 | 4 |
| 4-3 | 1 |
| 3-9 | −6 + 13 = 7 |
| 9-7 | 2 |
| 7-6 | 1 |
| 6-2 | 4 |
| 2-5 | 3 |
| 5-10 | −5 + 13 = 8 |
| 10-A | −4 + 13 = 9 |
| A-K | 1 |
| K-Q | 1 |
| Q-J | 1 |

Resulting buckets of differences

| Bucket | Count | Count/12 (Prob) | prob * log(prob) |
|---|---|---|---|
| 0 | 0 | 0 | 0 |
| 1 | 5 | 0.41667 | −0.1584 |
| 2 | 1 | 0.08334 | −0.0899 |
| 3 | 1 | 0.08334 | −0.0899 |
| 4 | 2 | 0.16667 | −0.1297 |
| 5 | 0 | 0 | 0 |
| 6 | 0 | 0 | 0 |
| 7 | 1 | 0.08334 | −0.0899 |
| 8 | 1 | 0.08334 | −0.0899 |
| 9 | 1 | 0.08334 | −0.0899 |
| 10 | 0 | 0 | 0 |
| 11 | 0 | 0 | 0 |

-continued

| Card Ordering: 8, 4, 3, 9, 7, 6, 2, 5, 10, A, K, Q, J | | | |
|---|---|---|---|
| 12 | 0 | 0 | 0 |
| Sum | | | −0.7376 |

The sum of all prob * log(prob) is −0.7376. Multiplying by −1 results in 0.7376. This shows more disorder. This is the result of the Shannon Entropy calculation of the cards shown in FIG. 3.

These three examples show that disorder can be quantified and calculated. The perfectly ordered cards have a order metric of 0. The slightly disordered cards have an order metric of 0.3133. The more disordered cards have an order metric of 0.7376. The approach to showing how disorder in a set of cards can be quantified is also applicable to quantifying how much order or disorder is in a series of numbers.

An appreciation of other aims and objectives of the present disclosure and a more complete and comprehensive understanding of this disclosure may be obtained by studying the following description of a preferred embodiment, and by referring to the accompanying drawings.

A BRIEF DESCRIPTION OF THE DRAWINGS

A DETAILED DESCRIPTION OF PREFERRED & ALTERNATIVE EMBODIMENTS

I. Overview of the Invention

Figure 1:
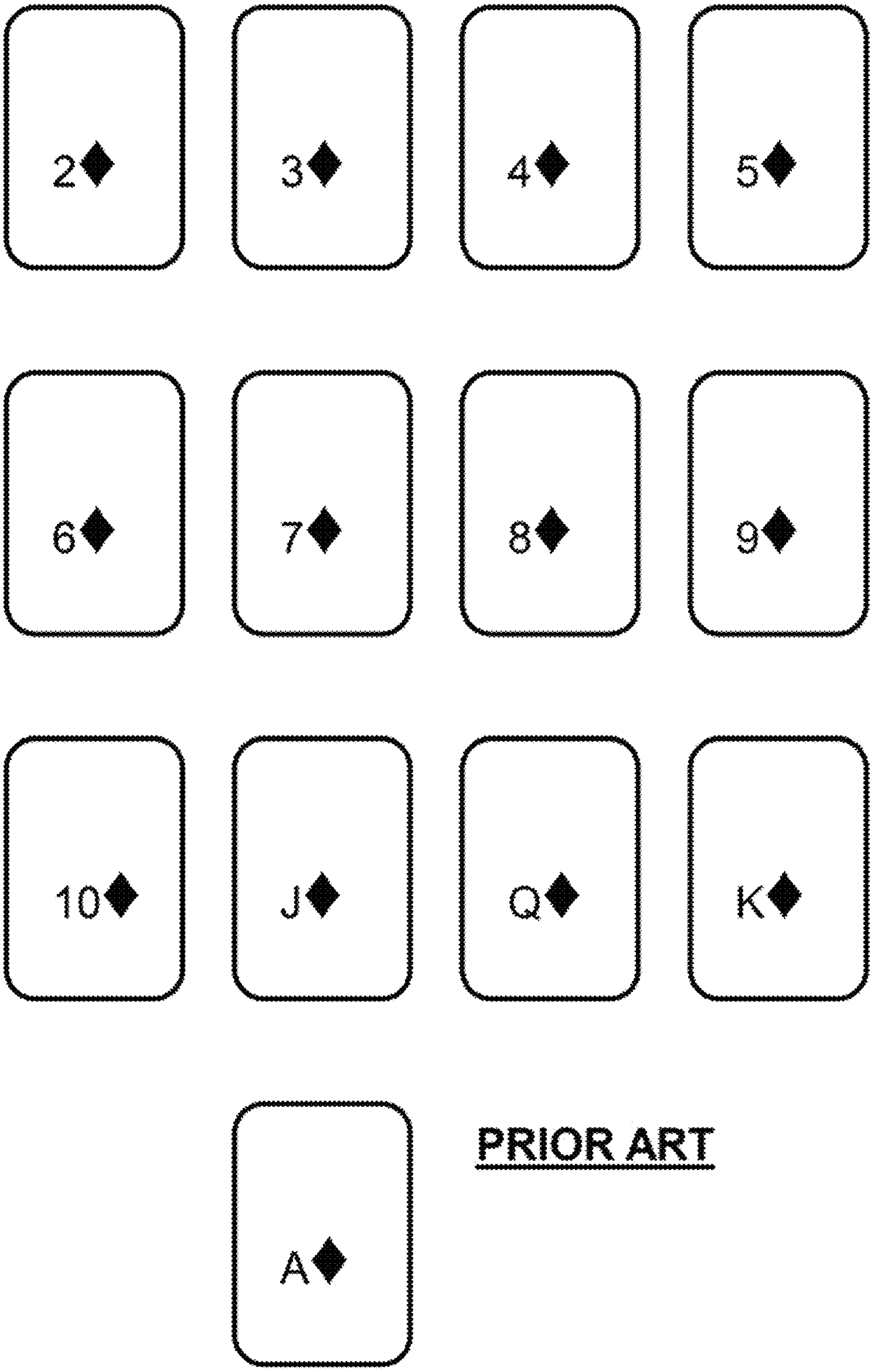
FIGS. 1, 2 and 3 are images showing sets of playing cards.

A measurement of order 16 is a measurement of entropy. Entropy measurements and measurements of order 16 are measurements of how ordered or dis-ordered is the target data 11. The measurement of order 16 is the information entropy present in the target data. Highly ordered data has low randomness and low entropy, and highly unordered data has high randomness, and correspondingly high entropy. Text files have low randomness and entropy, and a high level of order. The files that are computer applications, sometimes known as binaries, also have a high level of order. Encrypted files exhibit a low level of order. Some compressed filed also exhibit a low level of order. The one embodiment of the present invention detects changes in measurements of order 16 that fall outside of a predefined range of order 23. This detects the change in entropy when a file is encrypted.

To address detection of encryption of compressed files which also exhibit high randomness, the system uses multiple measurements of order 16 covering different portions of the target data 11. Each of these portions is called an EnFret 40. An EnFret 40 is the data for which a measurement of order is made. Target data 11 often has structured file headers or other structure 34 that have high measurements of order 16, followed by data that may have low measurements of order 16. Measuring the order of the target data 11 at multiple places allows target data 11 with mixed structures and random data to be processed using multiple EnFrets 40. Each Enfret 40 may be of a same or different size as another EnFret 40. Each EnFret 40 may be adjacent or discontiguous to another EnFret 40. An EnFret 40 may overlap another Enfret 40 so that some of the data in a first Enfret 40 is also used in a second EnFret 40. An EnFret 40 (Entropy Fret) can be thought of like a fret on the neck of a guitar. Choosing the frets on which to place your fingers produces different resulting sounds and music. Choosing different EnFrets 40 from the target data 11 produces different results.

One embodiment of the present invention produces measurements of order. These measurements of order are written in a random access memory and/or in a storage medium, and change the state of components within the device.

The selection of what portion of target data 11 each EnFret 40 covers is driven by the two goals of low false positives and low false negatives in the detection of ransomware encrypting target data 11.

There are numerous algorithms used to measure order and approximate Shannon Entropy. Examples of these algorithms include the Chi-squared test, Arithmetic mean, Monte Carlo value for Pi, and Serial Correlation Coefficient. The one embodiment of the present invention may use different order measurement algorithms for different target data 11 types. When comparing measurements of order, the algorithms ApEn (Approximate Entropy), SampEn (Sample Entropy), cross-ApEn (Asynchrony between two different time series), and cross-SampEn (Used to measure the similarity of two distinct time series) may also be used.

One embodiment of the present invention reads files on a filesystem and is able to read file data and metadata. The filesystem is responsible for interacting with the storage device to store and retrieve files and for the arrangement of the data on the storage device. A filesystem is analogous to a repository of data 12. A file within a filesystem is analogous to target data 11. A database is analogous to a repository of data 12. A record within a database is analogous to target data 11.

A filesystem is a data structure that an operating system uses to control how data is stored and retrieved. Metadata is data that provides information about other data, but not the content of the data, such as the text of a message or the image itself.

The filesystem is also responsible for the file metadata, the data about the data. The file metadata includes information such as file name and file length. It may also include file creation date, last modification date, access permissions, filesystem integrity data, and file type. The storage device is responsible for the accurate storage and retrieval of data supplied to it by the filesystem. The storage device may be any form of hard drive, including spinning media and solid-state devices, or any other suitable non-volatile memory device or technology.

The communications between the filesystem and the storage device are storage operations. Storage operations are typically read, write and delete. Additional storage operations may specify performance, security and other operating parameters.

One embodiment of the invention operates by comparing reference entropy metrics known as pre-determined levels of order 22 against entropy measurements, known as measurements of order 16 calculated for each EnFret 40 within the target data 11.

If the difference between the pre-determined levels of order 22 and the measurements of order 16 exceeds a range of order 23, an indication is produced which signals that at least one of the entropy measurements has exceeded the at least one of the range of order 23 and the corresponding target data 11 may have been encrypted.

II. Brief Description of a Preferred Embodiment of the Invention

In one embodiment of the present invention, target data 11 is read from a repository of data 12. Upon reading the target data 11, an order measurement sensor 14 calculates a number of measurements of order 16 of the target data 11. Each measurement of order 16 is calculated from an EnFret 40 which describes the portion of the target data 11 to use. A measurement of order 16 is measurement of how ordered or dis-ordered is the target data 11. The measurement of order 16 is the information entropy present in the target data 11. Highly ordered data has low randomness, and highly unordered data has high randomness. Target data 11 containing only text has low randomness and a corresponding high measurement of order 16. Target data 11 containing computer applications, known as binaries, also have a relatively high measurement of order 16. Target data 11 containing encrypted or compressed data exhibit a low measurement of order 16. The order measurement sensor 14 calculates a measurement of order 16 across multiple portions of the target data 11, producing a plurality of measurements of order 16P.

Once the order measurement sensor 14 has calculated a plurality of measurements of order 16P, a comparator 18 compares the measurement of order 14 with a plurality of pre-determined levels of order 22P retrieved from a library 20.

One embodiment of the present invention compares reference entropy metrics, known as pre-determined levels of order 22, against entropy measurements. The results of these comparisons are written in a random access memory and/or in a storage medium, and change the state of components within the device.

The comparator 18 also has a predetermined plurality of ranges of order 23P. Each of these ranges of order 23 describes a boundary threshold, where measurements outside of the boundary may indicate data tampering. If the comparator 18 determines that at least one of these measurements of order 16 falls outside of the plurality of range of order 23P, then an indicator 24 indicates that an anomalous measurement of order 16 has been made. This detects a change in at least one of the plurality of measurements of order 16P when the target data 11 is tampered with and encrypted.

An access manager 26 may receive an indication of data tampering 19 from the indicator 24 and prevent the target data 11 from being stored, written, or otherwise used. In this way, blocking unauthorized encryption of data, and thus preventing ransomware from operating.

While the examples used here refer to target data 11 for ease of explanation and teaching, the use of a plurality of measurements of order 16P entropy can be applied to any target data, such as a file, data in computer memory, or data being received via a communications channel. Computer memory includes volatile and non-volatile memory technologies. Data in volatile storage does not persist when power is removed. Data in non-volatile storage does persist when power is removed. Flash memory is an example for non-volatile memory.

In another embodiment of the present invention, files on a filesystem are read, including any associated file data and meta data.

The present invention operates by comparing pre-determined levels of order and their corresponding acceptable ranges against the plurality of measurements of order calculated for each file. If any of the differences falls outside of the corresponding acceptable range, the present invention indicates that the calculated level of order has exceeded the range of order and the corresponding file may have been encrypted.

III. A Detailed Description of Preferred and Alternative Embodiments

Figure 2:
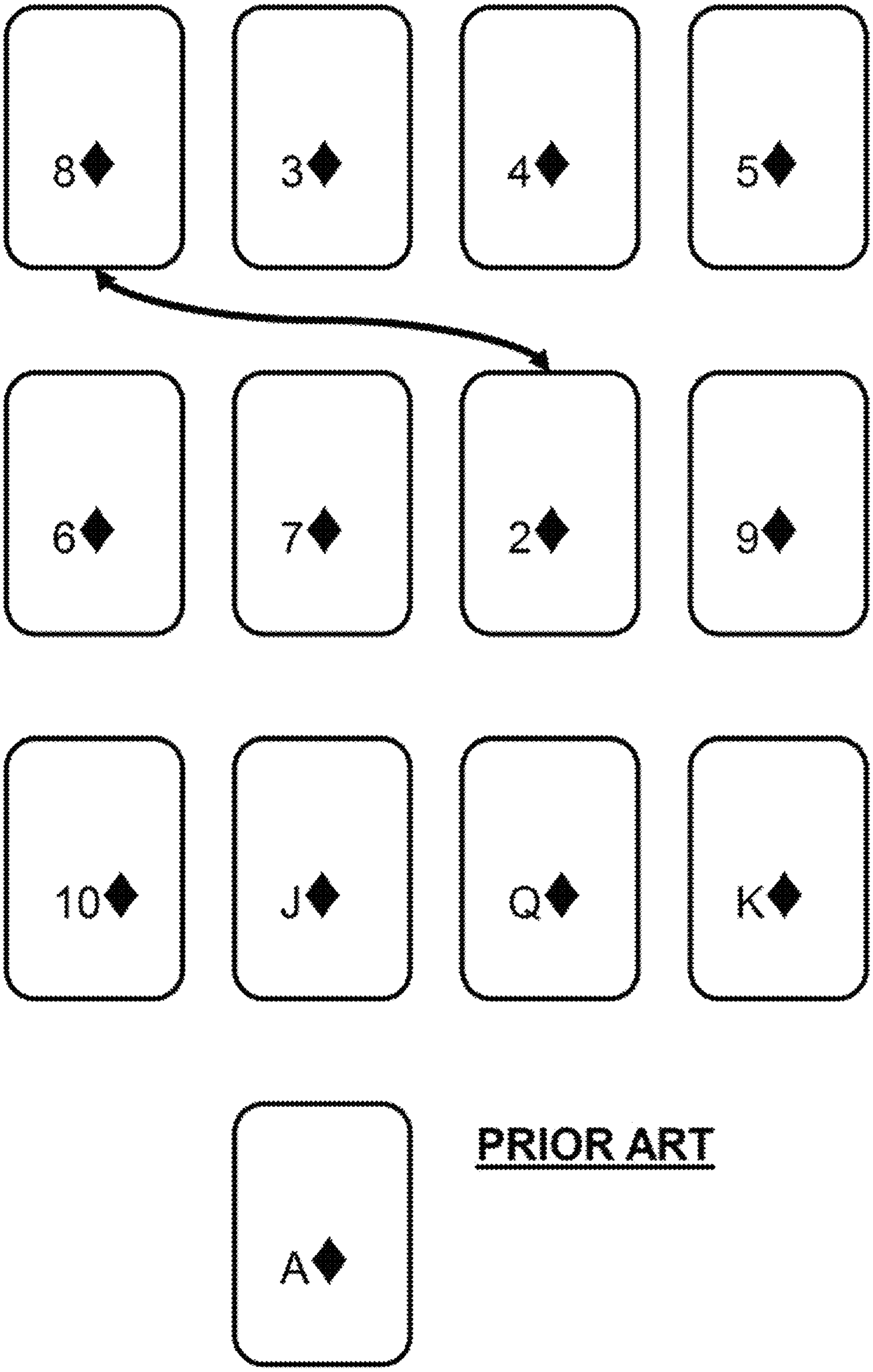
Figure 3:
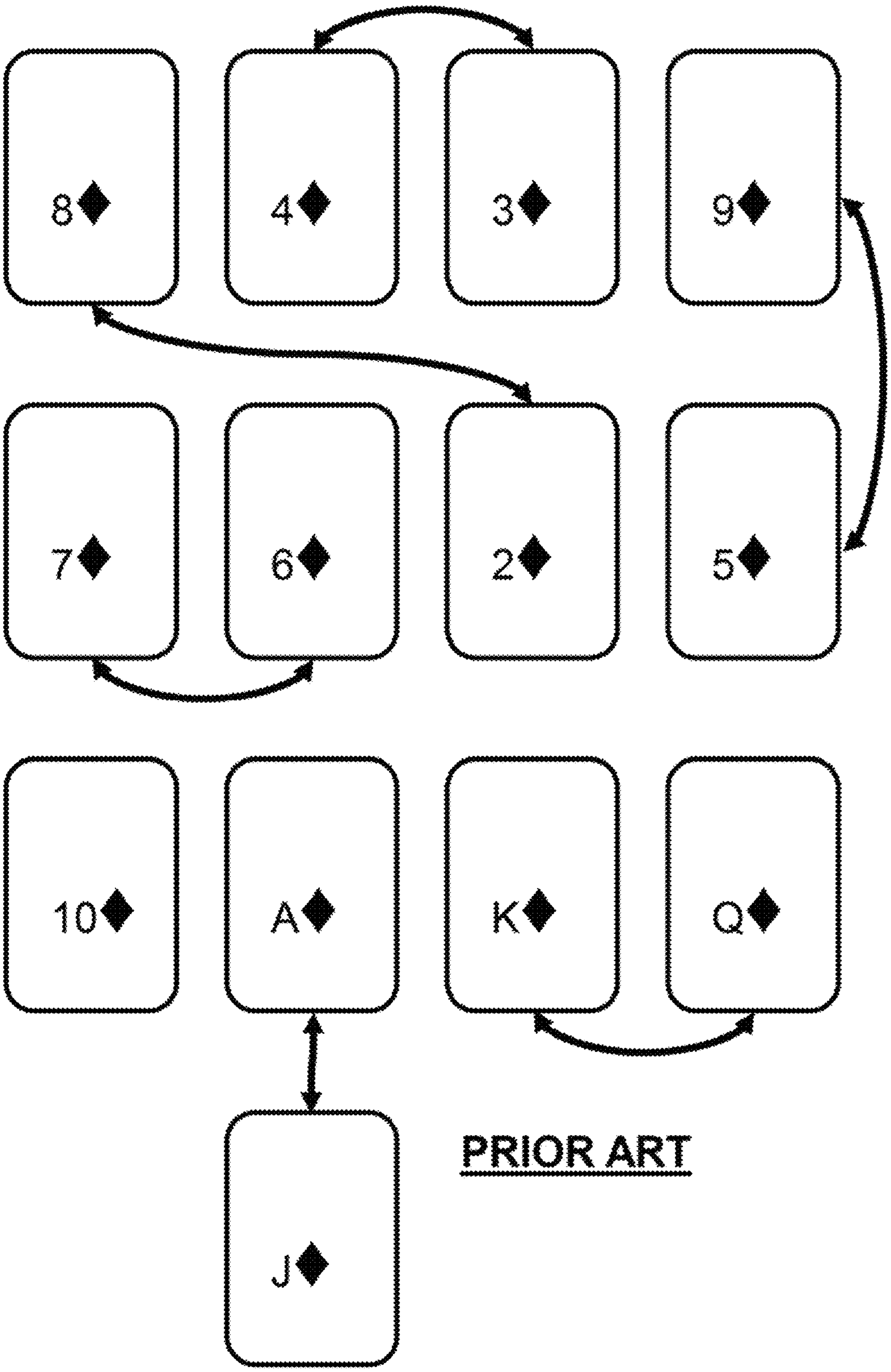

FIGS. 1, 2 and 3 are provided to help describe the background of the invention, and should be considered as prior art.

FIG. 1 shows images of playing cards arranged in order from 2 through A.

FIG. 2 shows images of playing cards arranged with 2 of the cards out of the order of 2 through A.

FIG. 3 shows images of playing cards arranged with 12 of the 13 cards out of the order of 2 through A.

Figure 4:
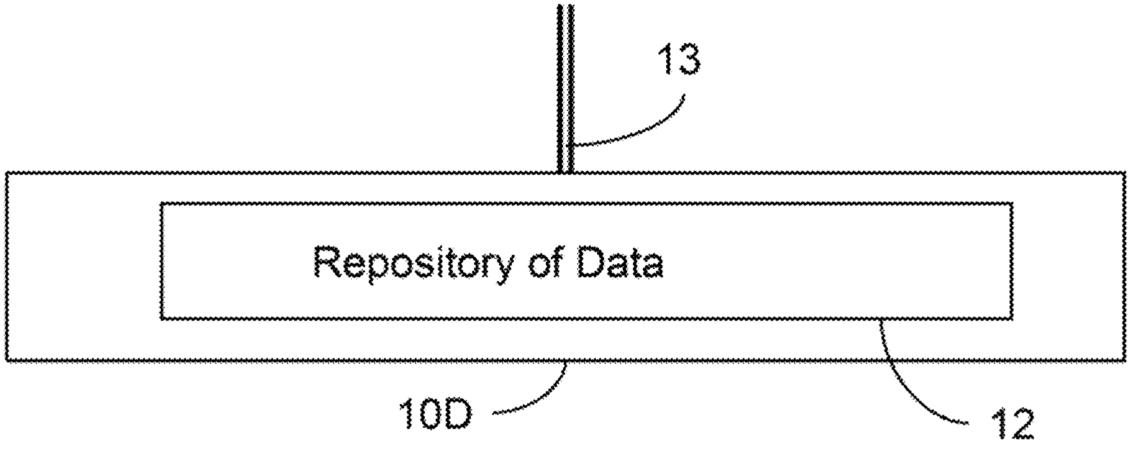
FIG. 4 shows an image of an electronic storage device.

FIG. 4 shows an image of an electronic storage device 10D in a repository of data 12. The electronic storage device 10D has a connection 13 to another electronic device.

Figure 5:
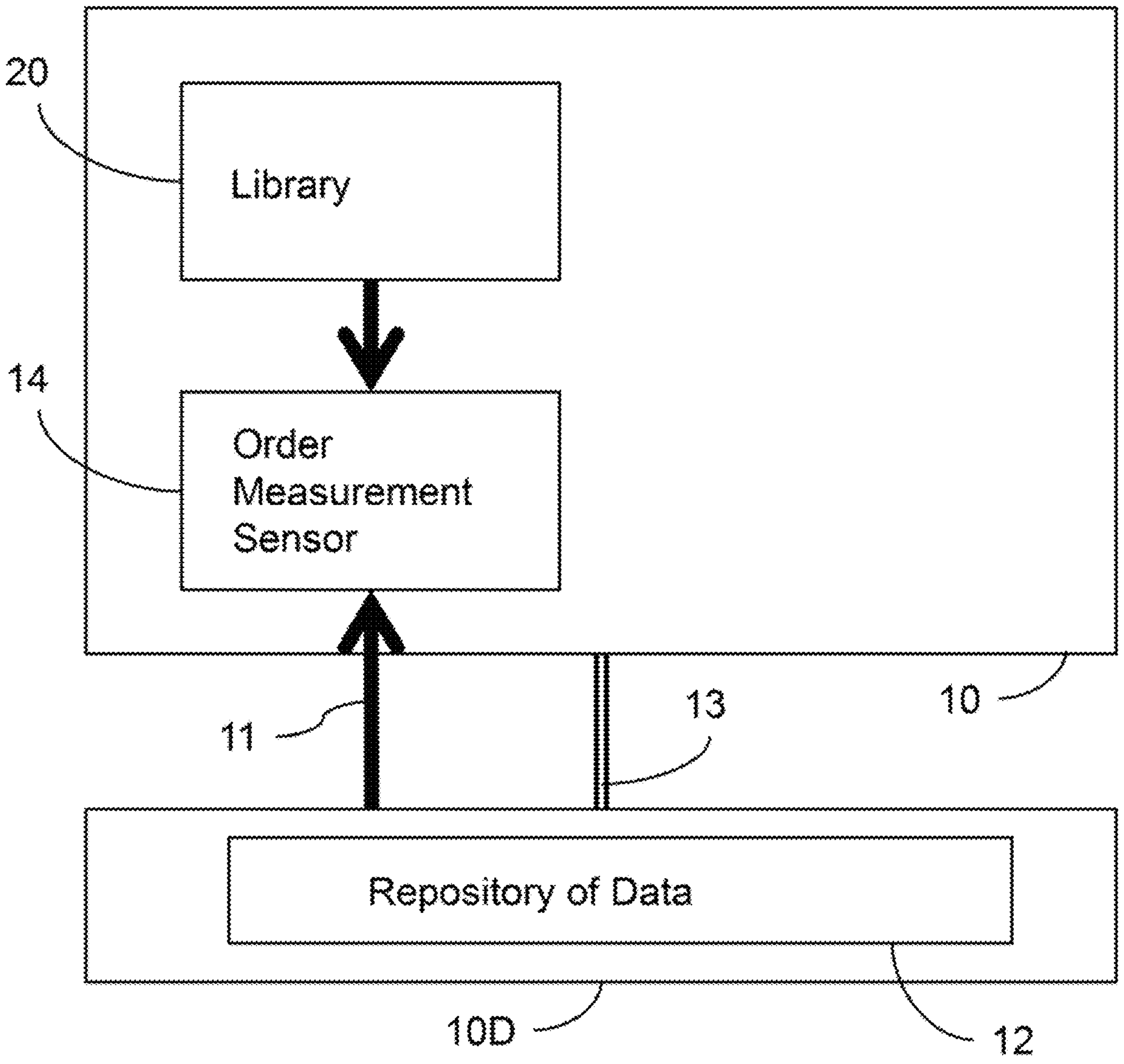
FIG. 5 shows the operation of the order measurement sensor.

FIG. 5 shows the operation of the order measurement sensor. An electronic device 10 has a connection 13 to a repository of data 12 in an electronic storage device 10D. An order measurement sensor 14 is continuously sensing target data 11 from the connected device, measuring the order. The order measurement sensor 14 generally looks at the data all of the time, measuring the order. A library 20 is connected to the order management sensor 14 and provides EnFret configuration information.

Figure 6:
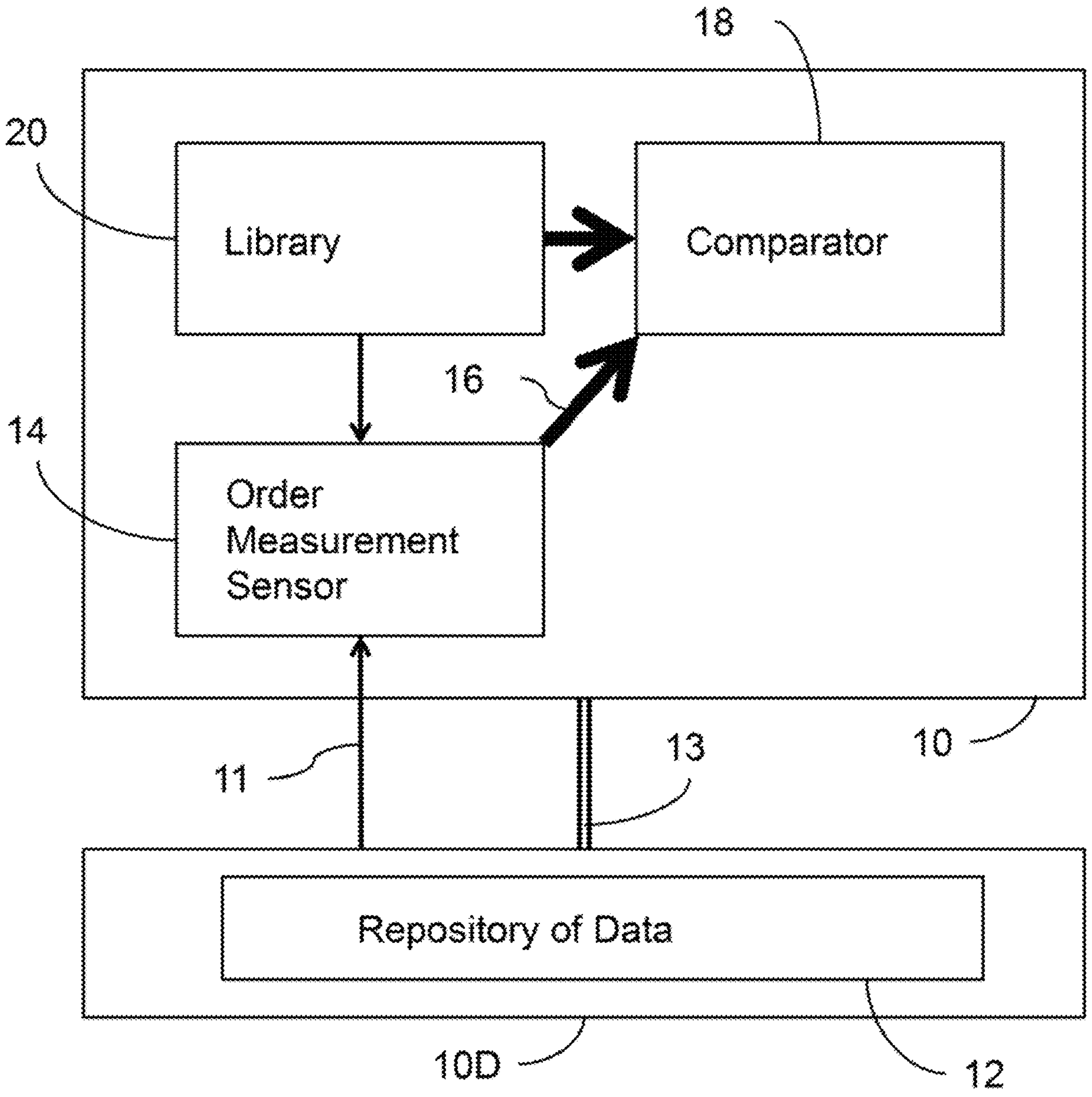
FIG. 6 shows the operation of the comparator.

FIG. 6 shows the operation of the comparator 18. An electronic device 10 has a connection 13 to a repository of data 12 in an electronic storage device 10D. A comparator 18 is attached to the order measurement sensor 14 and a library 20 containing reference order levels and ranges. The comparator 18 compares the measurements of order 16 to reference order levels and ranges stored in the library 20 and detects an attack when the measurements fall outside of the ranges.

Figure 7:
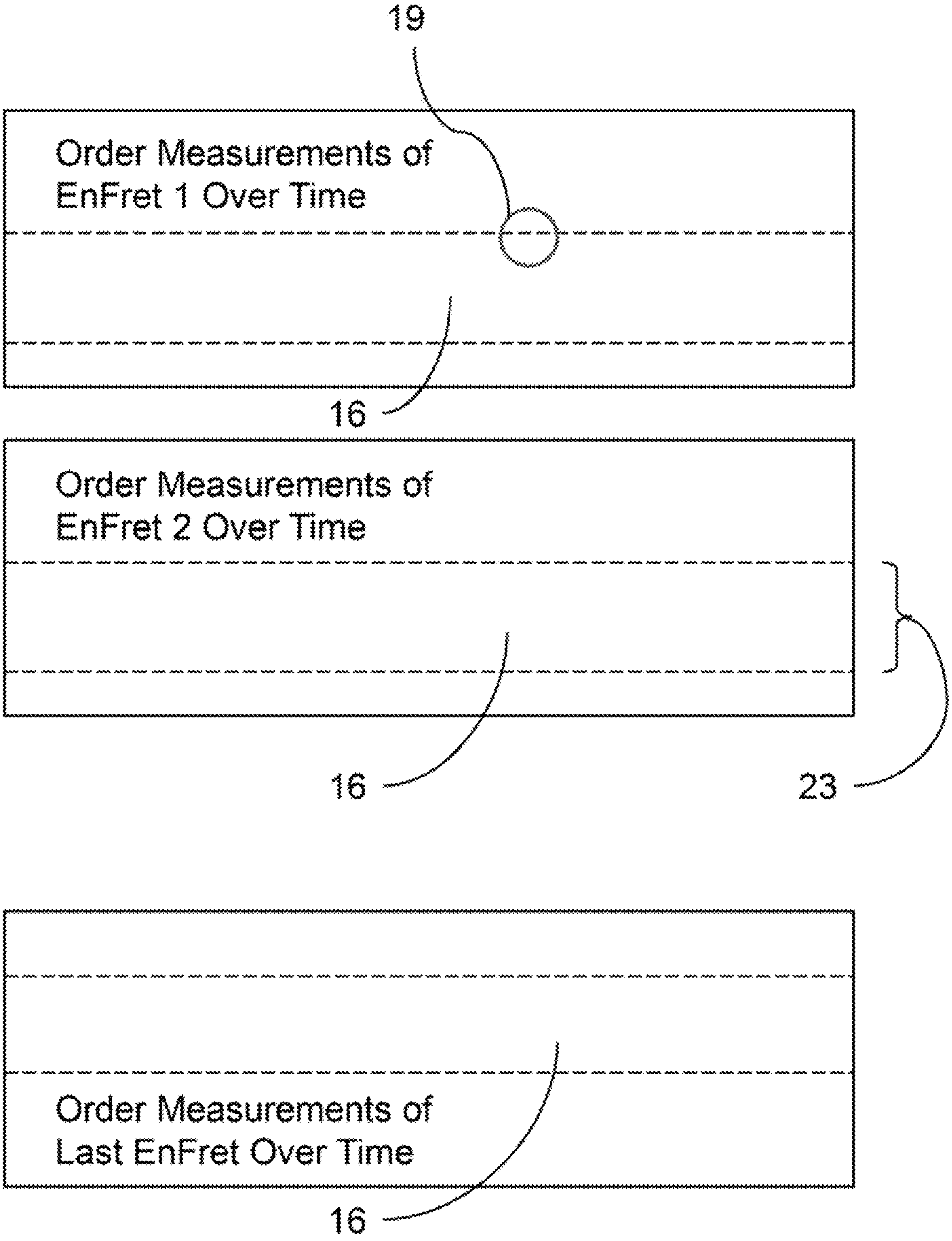
FIG. 7 shows the operation of the comparator.

FIG. 7 shows the operation of the comparator 18. The comparator 18 retrieves reference order levels and ranges from the library 20. For each EnFret 40 of data, the measurement of order 16 is compared with the corresponding range of order 23. If any of the measurement of order 16 falls outside of the range of order 23, it is detected as an indication of data tampering 19 by the comparator 18. EnFret 1 shows where an indication of data tampering 19 begins and is detected by the comparator 18.

One embodiment of the present invention uses a comparator 18 to compares measurements of order 14 with a plurality of pre-determined levels of order 22P retrieved from a library 20. The results of these comparisons are written in a random access memory and/or in a storage medium, and change the state of components within the device.

One embodiment of the present invention uses a comparator 18 to retrieve reference order levels and ranges from the library 20. For each EnFret 40 of data, the measurement of order 16 is compared with the corresponding range of order 23. If any of the measurement of order 16 falls outside of the range of order 23, it is detected as an indication of data tampering 19 by the comparator 18. EnFret 1 shows where an indication of data tampering 19 begins and is detected by the comparator 18. The indications of data tampering are written in a random access memory and/or in a storage medium, and change the state of components within the device.

Figure 8:
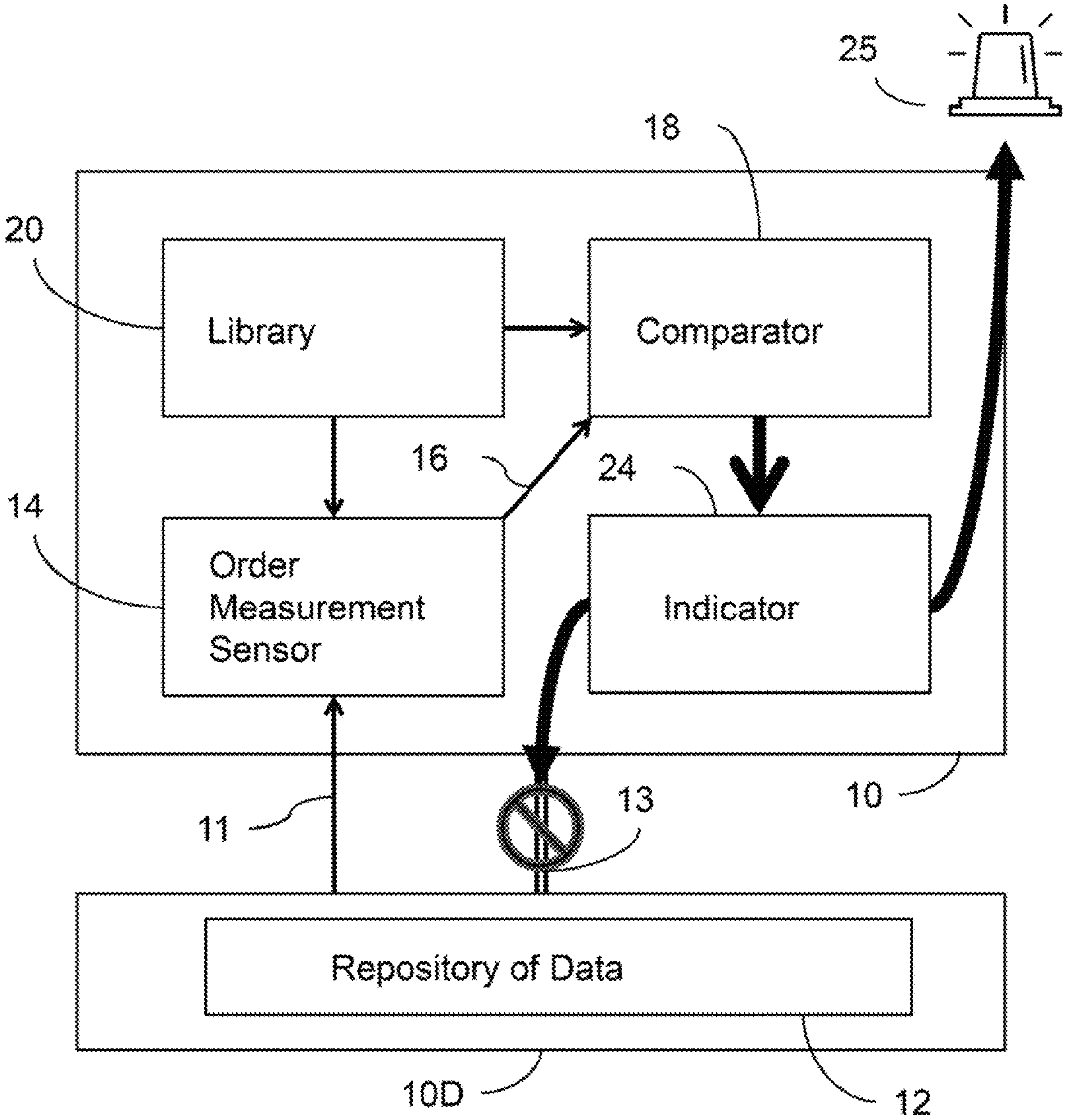
FIG. 8 shows the operation of the indicator.

FIG. 8 shows the operation of the indicator 24. An electronic device 10 has a connection 13 to a repository of data 12 in an electronic storage device 10D. A comparator 18 is attached to the order measurement sensor 14, a library 20 of reference order levels and ranges, and an indicator. The comparator 18 signals the indicator 24 that a measurement of order 16 is outside of the acceptable range. The indicator 24 makes an alarm 25 and/or breaks the connection 13, blocking access to the electronic storage device 10D, thereby blocking the ransomware from encrypting the data.

Figure 9:
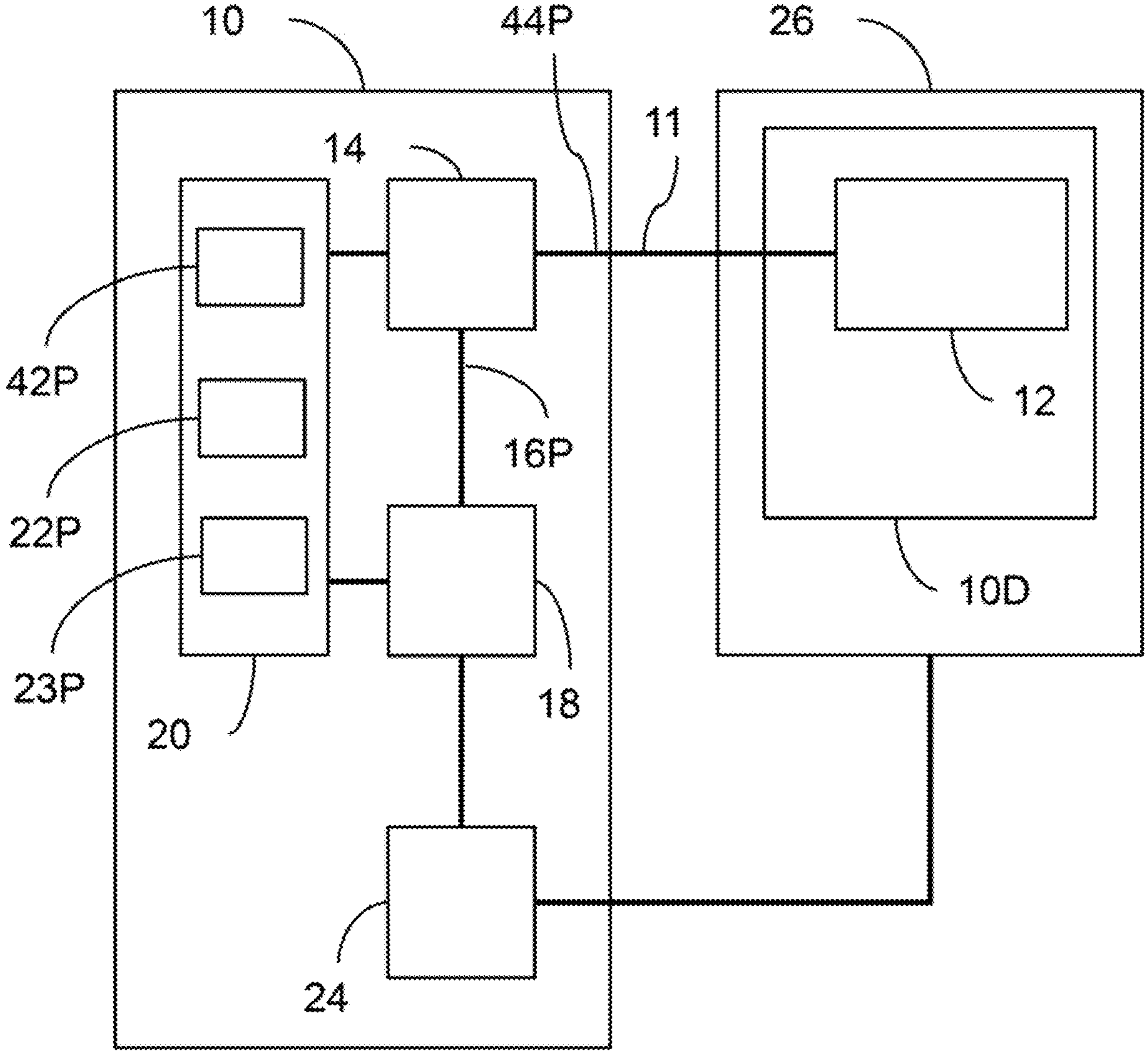
FIG. 9 shows a diagram of one embodiment of the present invention.

FIG. 9 shows a diagram of an embodiment of an electronic device 10. Target data 11 from a repository of data 12 located within an electronic storage device 10D is communicated to an order measurement sensor 14. The order management sensor 14 is connected to a library 20 containing a plurality of predetermined EnFret configurations 42P. The plurality of predetermined EnFret configurations 42P are used to produce a plurality of configured EnFrets 44P. The order measurement sensor 14 produces a plurality of measurements of order 16P using the plurality of configured EnFrets 44P contained within the target data 11 and communicates the plurality of measurements of order 16P to a comparator 18. The comparator 18 is connected to a library 20 containing a plurality of pre-determined levels of order 22P and a plurality of range of order 23P. The comparator 18 is also connected to an indicator 24. In one embodiment, the indicator 24 is connected to an access manager 26.

Figure 10:
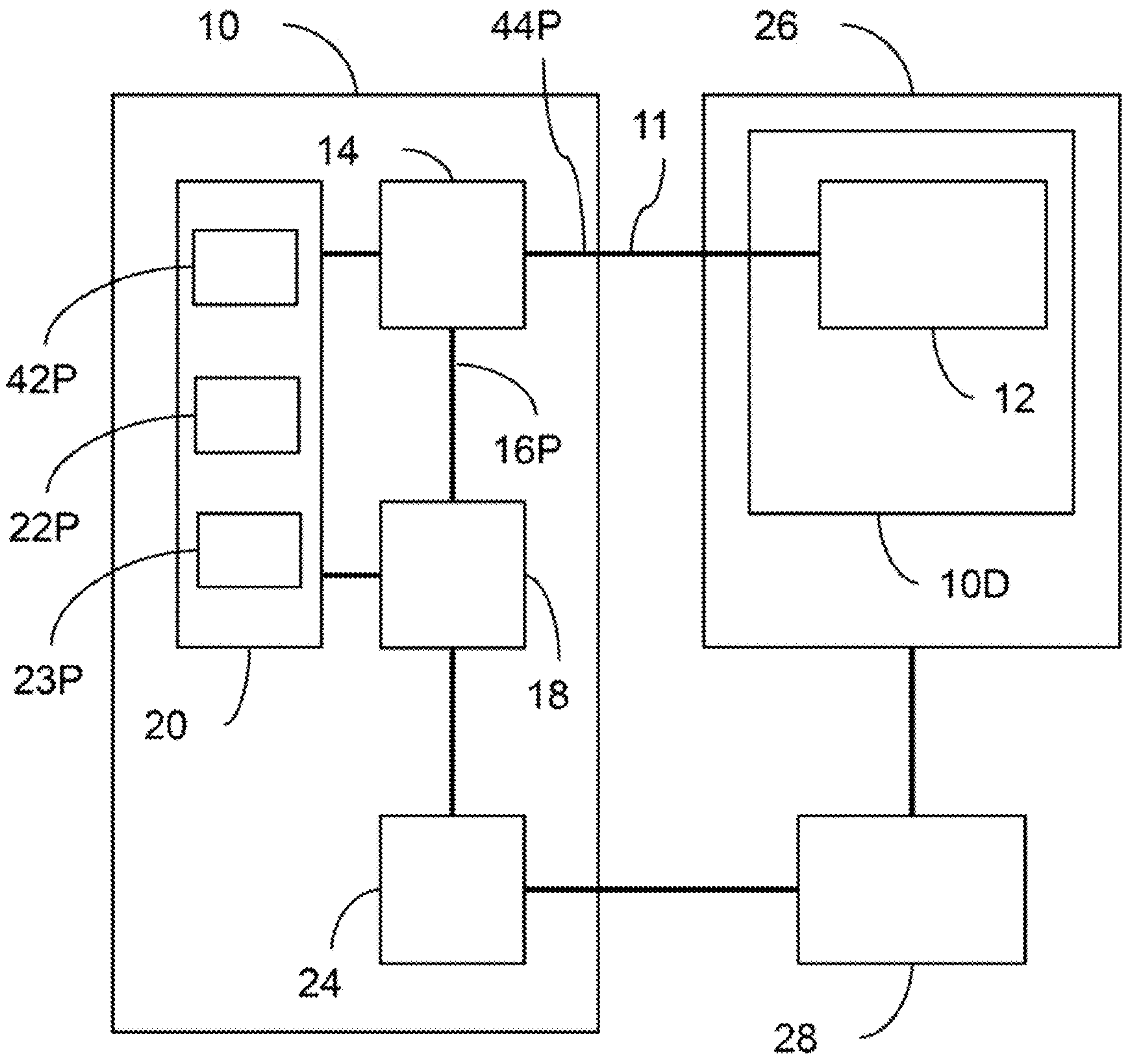
FIG. 10 shows a diagram of an alternate embodiment of the present invention.

FIG. 10 shows a diagram of an alternate embodiment an electronic device 10. Target data 11 from a repository of data 12 located within an electronic storage device 10D is communicated to an order measurement sensor 14. The order management sensor 14 is connected to a library 20 containing a plurality of predetermined EnFret configurations 42P. The plurality of predetermined EnFret configurations 42P are used to produce a plurality of configured EnFrets 44P. The order measurement sensor 14 produces a plurality of measurements of order 16P using a plurality of configured EnFrets 44P contained within the target data 11 and communicates the plurality of measurements of order 16P to a comparator 18. The comparator 18 is connected to a library 20 containing a plurality of pre-determined levels of order 22P and a plurality of range of order 23P. The comparator 18 is also connected to an indicator 24. In one embodiment, the indicator 24 is connected to a false positive reduction evaluator 28. In one embodiment, the false positive reduction evaluator 28 is connected to an access manager 26.

One embodiment of the present invention utilizes an access manager 26 to receive an indication of data tampering 19 from the indicator 24 and to prevent the target data 11 from being stored, written, or otherwise used. These indications are written in a random access memory and/or in a storage medium, and change the state of components within the device.

Figure 11:
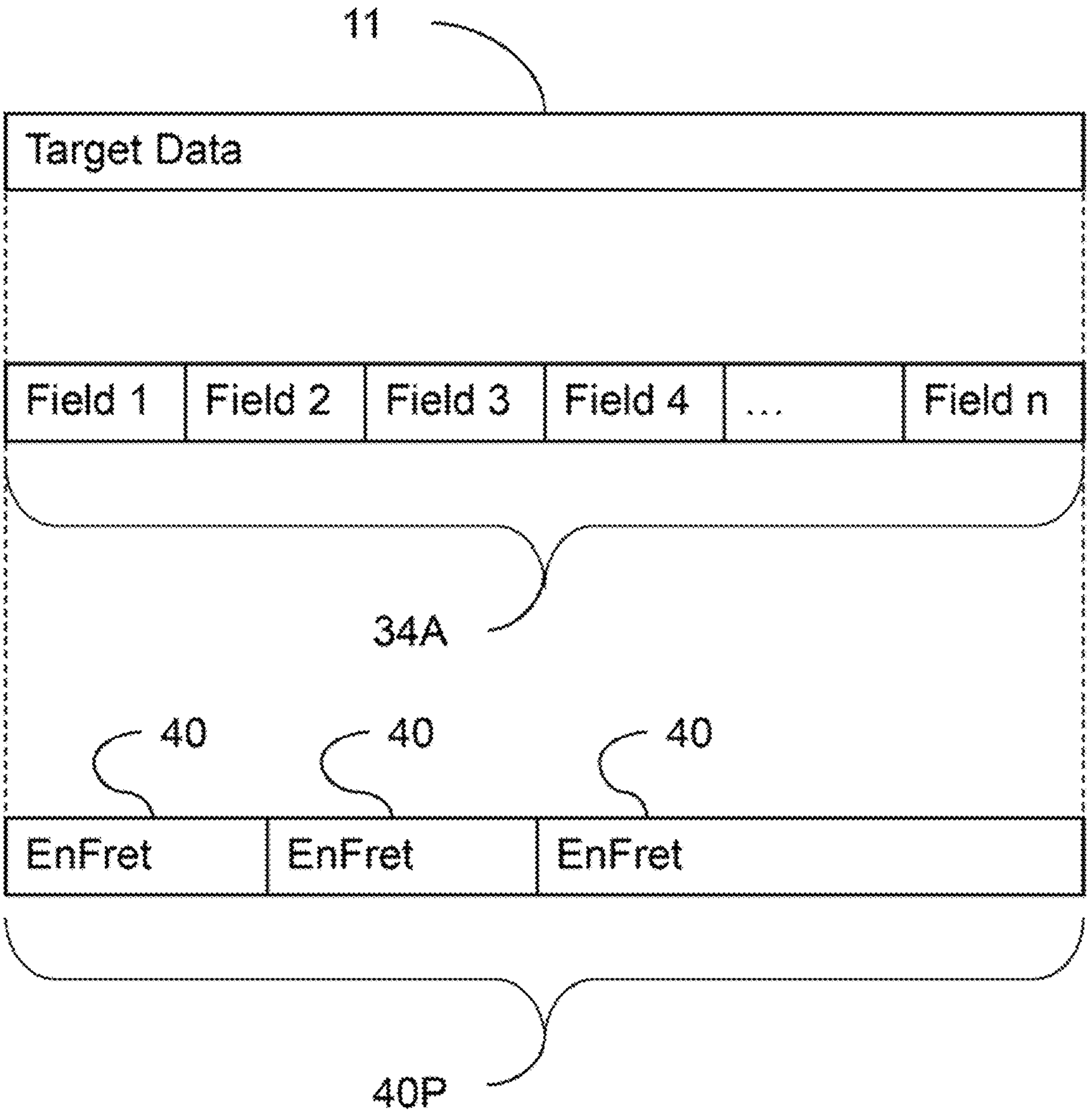
FIG. 11 shows a schematic diagram of the data relationships in one embodiment of the present invention.

FIG. 11 shows a schematic diagram of the data relationships in the present invention. The target data 11 has a first structure 34A, composed of fields. The target data 11, when processed by the present invention is separated into a plurality of EnFrets 40P.

Figure 12:
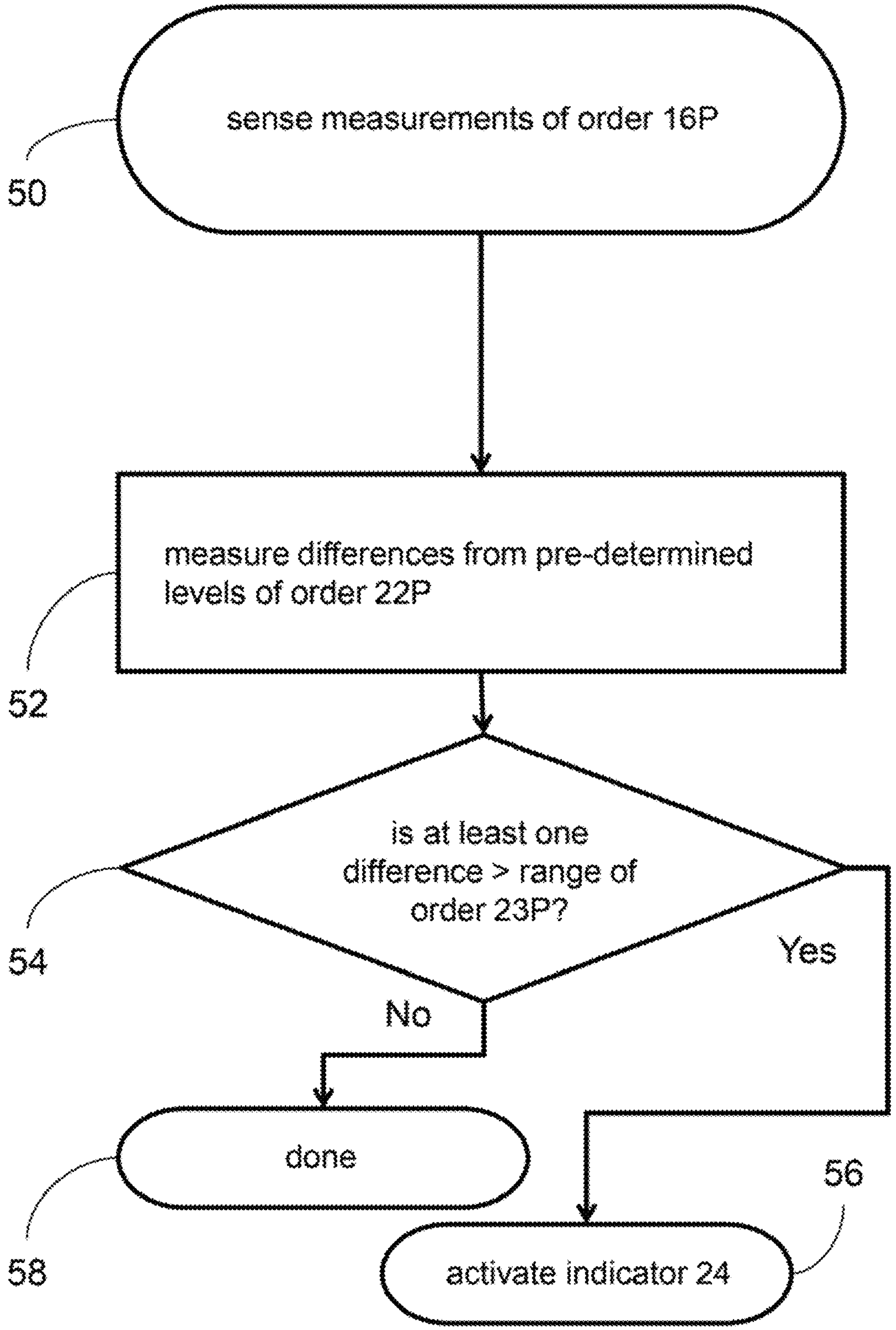
FIG. 12 is a flowchart of the operation of one embodiment of the present invention.

FIG. 12 is a flowchart of the operation of the present invention. In flowchart 1, step 1 50 a plurality of measurements of order 16P are sensed and proceeds to flowchart 1, step 2 52. In flowchart 1 step 2 52, differences from pre-determined levels of order 22 are calculated and proceeds to flowchart 1, step 3 54. In flowchart 1, step 3 54, if at least one of the calculated differences falls outside the corresponding range of order 23, proceed to flowchart 1, step 4 56. In flowchart 1, step 3 54, if none of the calculated differences falls outside the corresponding range of order 23, proceed to flowchart 1, step 5 58. In flowchart 1, step 4 56, activates indicator 24. In flowchart 1, step 5 58, processing stops.

Figure 13:
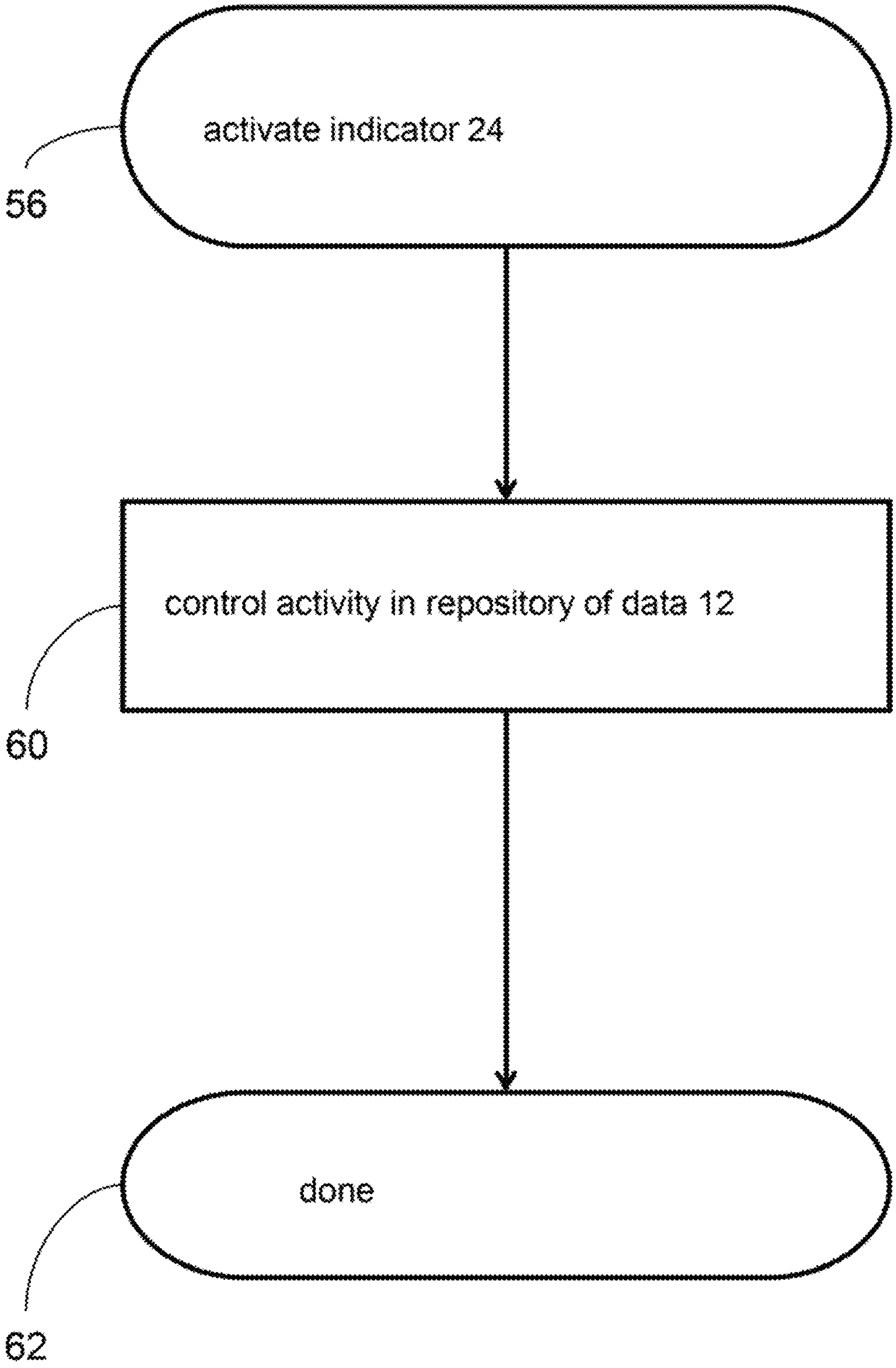
FIG. 13 is a flowchart of additional processing of the one embodiment of the present invention.

FIG. 13 is a flowchart of additional processing of the present invention. In flowchart 1, step 4 56 activates indicator 24 and processing proceeds to flowchart 2, step 1 60. In flowchart 2, step 1 60, activity is controlled in the repository of data 12 and proceeds to flowchart 2, step 2 62. In flowchart 1, step 3 62 processing stops.

Figure 14:
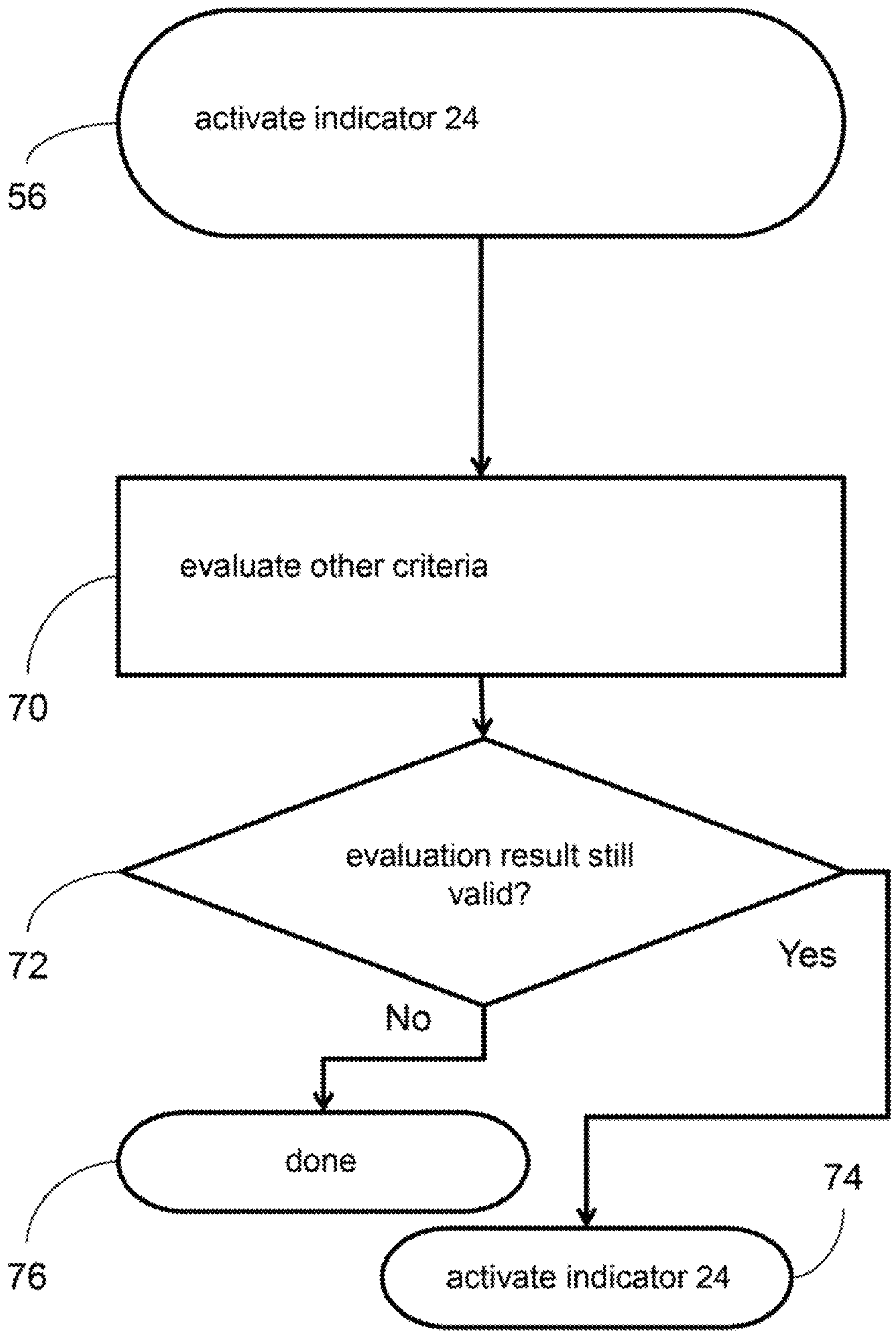
FIG. 14 is a flowchart of additional processing of the one embodiment of the present invention.

FIG. 14 is a flowchart of additional processing of the present invention. In flowchart 1, step 4 56 activates indicator 24 and processing proceeds to flowchart 3, step 1 70. In flowchart 3, step 1 70 additional criteria are evaluated and preceding proceeds to flowchart 3, step 2 72. In flowchart 3, step 3 72, If the results of the additional criteria evaluation support the decision that ransomware has been detected, proceed to flowchart 3, step 3 74. In flowchart 3, step 3 72, If the results of the additional criteria evaluation does not support the decision that ransomware has been detected, proceed to flowchart 3, step 4 76. In flowchart 3, step 3 74, activates indicator 24. In flowchart 3, step 4 76 processing stops.

Figure 15:
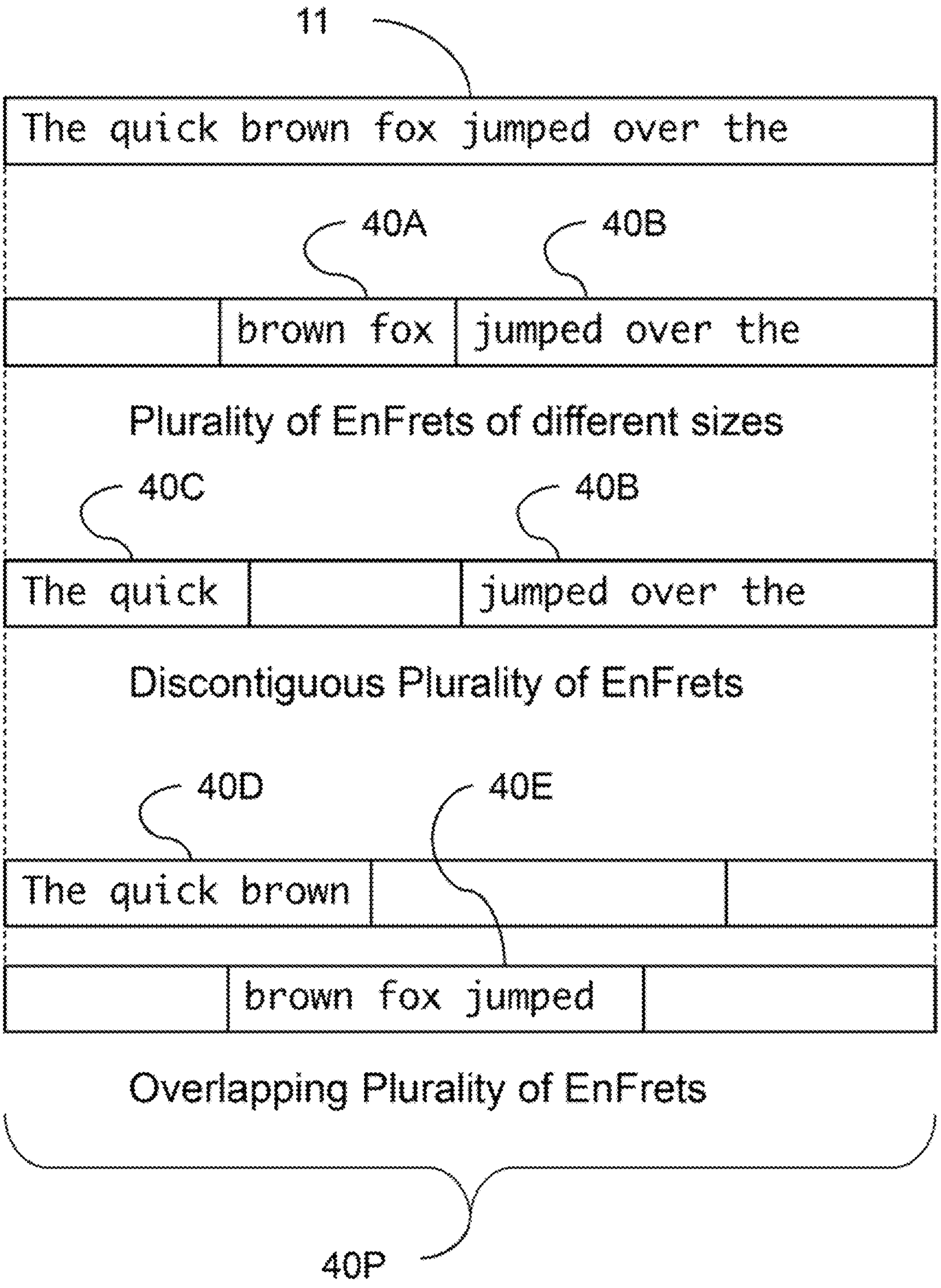
FIG. 15 shows a schematic diagram of the data relationships in one embodiment of the present invention.

FIG. 15 shows a schematic diagram of the data relationships in the present invention. The target data 11, when processed by the present invention is separated into a plurality of EnFrets 40P. In FIG. 15, the target data 11 is the words "The quick brown fox jumped over". EnFret A 40A is the portion of the target data 11 with the words "brown fox". EnFret B 40B is the portion of the target data 11 with the words "jumped over the". EnFret C 40C is the portion of the target data 11 with the words "The quick". EnFret D 40D is the portion of the target data 11 with the words "The quick brown". EnFret E 40E is the portion of the target data 11 with the words "brown fox jumped". Each EnFret 40 may be of a different size, as EnFret A 40A and EnFret B 40B are of different sizes. Each EnFret 40 may be discontiguous, i.e. there may be gaps between EnFrets 40, as EnFret B 40B is discontiguous from EnFret C 40C. Each EnFret 40 may overlap another EnFret 40, as EnFret E 40E overlaps with EnFret D 40D.

In one embodiment of the present invention, pre-determined levels of order 22 are calculated over a large amount of target data 11 of the same type, and a statistical distribution is calculated. These values are calculated for each of the EnFrets 40, producing a set of pre-determined levels of order 22 for each of the EnFrets 40 for a given target data type. The results of these calculations are written in a random access memory and/or in a storage medium, and change the state of components within the device.

Figure 16:
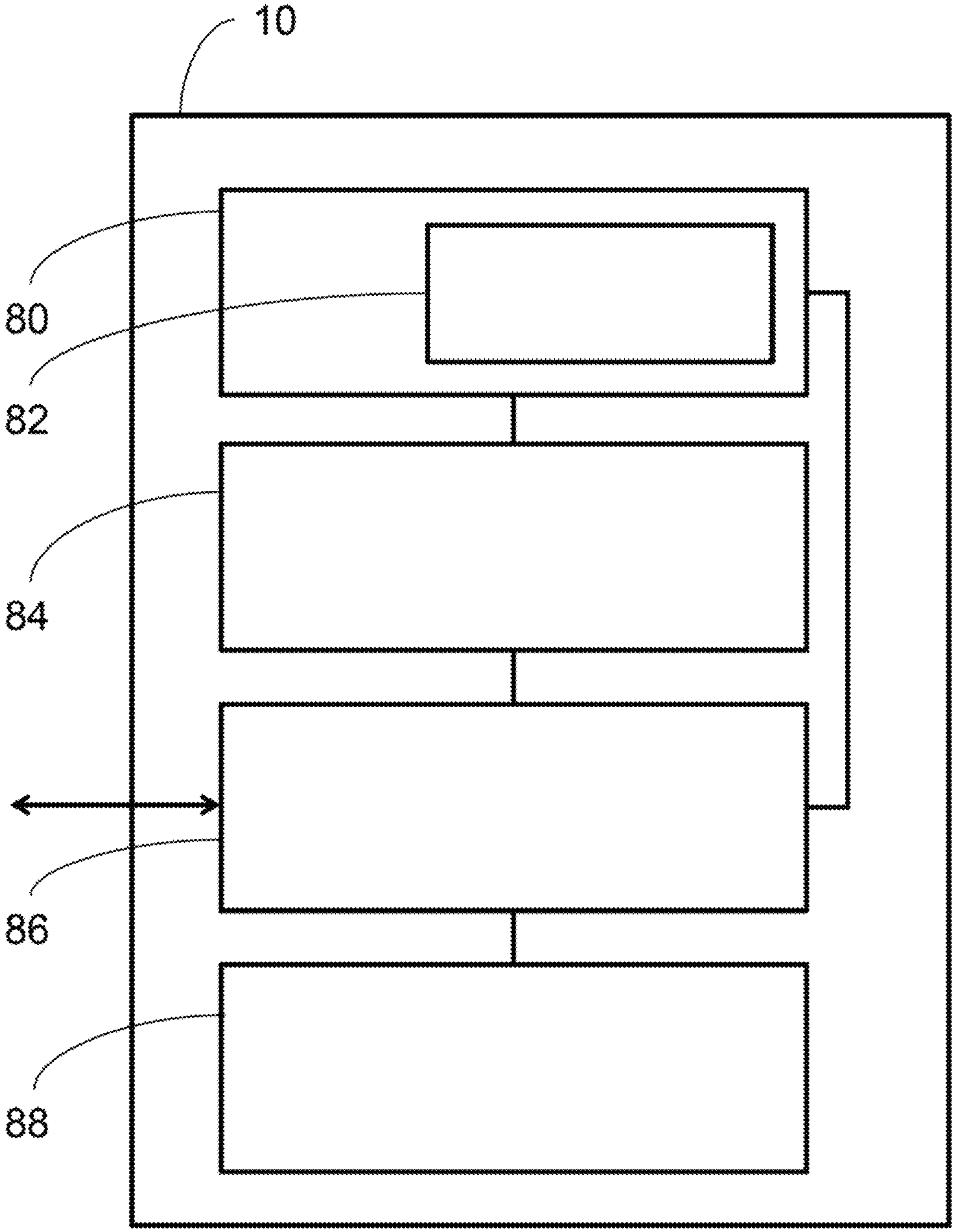
FIG. 16 shows a diagram of one embodiment of the present invention.

FIG. 16 shows a diagram of an embodiment of an electronic device 10. A memory 80 containing CPU instructions 82 is connected a CPU 84 and an input output interface 86. The input output interface 86 is connected to external input output devices (not shown). In one embodiment, the input output interface 86 is connected to storage 88.

IV. Methods of Operation of the Invention

The present invention operates on target data 11. The target data 11 is a sequence of bits, binary digits, ones and zeros, that represent data in a data processing system. Target data 11 is stored in a repository of data 12. The repository of data 12 may be any of multiple possible sources such as data memory, data storage, and data communications. The target data 11 often has associated formats or data structures that describes the layout of data relative to the bitstring. For target data 11 from computer filesystems, these are called the file structures. For target data 11 from computer memory, these are simply called data structures. Each different file structure or data structure is composed of fields. A field describes the data format and use within a data structure. For instance, there can be fields for text such as a name, numeric fields for arithmetic information, and special fields for calculated data, such as compressed or encrypted data.

For many data structures, there is often a set of fields called a header that describe another set of data fields that follows the header fields. Some portions of data structures are repeated multiple times. The internal structure of the target data 11 is the first structure 34A. The present invention creates at least two EnFrets 40 from the target data 11. The first EnFret 40 is generated from a first portion of the target data 11. There may be additional EnFrets 40 generated from additional portions of the target data 11. There will be a final EnFret 40 generated from the remaining portion of the target data 11. This method of generating at least two EnFrets 40 allows for the calculation of separate measurements of order 16 for header data and for non-header data.

The library 20 contains a plurality of predetermined EnFret configurations 42P. This plurality of predetermined EnFret configurations 42P is used by the order management sensor 14 to produce a plurality of configured EnFrets 44P. The configuration of an EnFret 40 describes the portion of the target data 11 that is included in each measurement of order 16, and the algorithm used to produce the measurement of order 16.

For each of the plurality of configured EnFrets 44P, a measurement of order 16 is calculated over the configured EnFret 44 by an order measurement sensor 14. Different types of data exhibit different amounts of randomness, and the measurement of order 16 is a measurement of the randomness. The order measurement sensor 14 may use different algorithms to produce the measurement of order 16. For example, using the arithmetic mean method for the measurement of order 16, this is the summing all the bytes in an EnFret 40 and dividing by the number of bytes in the EnFret 40. If the data is close to random, this number should be about 127.5. If the mean departs from this value, the values within the EnFret 40 are consistently high or low. Once the measurement of order 16 has been calculated for each of the EnFrets 40, the resulting measurements of order 16 are conveyed to a comparator 18. The comparator 18 compares the measurements of order 16 to pre-determined levels of order 22 and a range of order 23.

The pre-determined levels of order 22 are calculated similarly to the measurements of order 16. The pre-determined levels of order 22 are calculated over a large amount of target data 11 of the same type, and a statistical distribution is calculated. These values are calculated for each of the EnFrets 40, producing a set of pre-determined levels of order 22 for each of the EnFrets 40 for a given target data type. For example, reference pre-determined levels of can be calculated for mp3 files. Mp3 files have a similar structure, regardless of the type of audio they contain. To obtain the range of order 23, in one embodiment, a standard deviation is calculated over the measurements of order 16 on a per EnFret basis 40. Specifically, a standard deviation is calculated over the measurement of order 16 for the first EnFret 40, and another standard deviation is calculated over the measurement of order 16 for the next EnFret 40, and so on. The calculated standard deviations are used as the range of order 23.

In one embodiment of the present invention, a standard deviation is calculated over the measurement of order 16 for the first EnFret 40, and another standard deviation is calculated over the measurement of order 16 for the next EnFret 40, and so on. The results of these calculations are written in a random access memory and/or in a storage medium, and change the state of components within the device.

If all of the measurements of order 16 are within the corresponding range of order 23, no further action is taken. If any of the measurements of order 16 are outside the corresponding range of order 23, then an indication is made by the indicator 24. The indicator 24 indicates the detection of tampering.

In one embodiment, the indicator 24 is connected to an access manager 26. Upon receiving an indication from the indicator 24, the access manager 26 blocks or quarantines the target data 11 from being written, preventing ransomware from encrypting target data 11 in the repository of data 12. In this way, the access manager 26 prevents further activity after a changed measurement of order 16 is detected.

In one embodiment, the indicator 24 is connected to a false positive reduction evaluator 28. The false positive reduction evaluator 28 evaluates additional information and metadata about the target data 11 to reduce false positives in indicating tampering of the target data 11. The false positive reduction evaluator 28 may employ processing that is computationally more expensive than the order measurement sensor 14 and the comparator 18. The false positive reduction evaluator 28 may use any mechanism to reduce false positive indications. These false positive reduction mechanisms include recognizing specific software programs and computer processes. There are many methods to recognize software, including authenticating cryptographically signed software and using lists of allowed and dis-allowed software. Software recogition is well-known in the art.

In this Specification, the term software refers to both a software image in storage or memory, and the software processes that exist when software is operating. Once recognized, the false positive reduction mechanisms may allow or dis-allow the operation of specific software and computer processes. When software cannot be recognized, the false positive reduction mechanism may allow or dis-allow operation based behavioral analysis of software and computer processes. Methods for behavioral analysis of software are known in the art. The false positive reduction mechanism may also allow or dis-allow based on the meta-data of the target data 11.

In one embodiment, each of the plurality of measurements of order 16 and measured over a plurality of EnFrets 40, and each of the EnFrets 40 are contained within the target data 12. The EnFrets 40 may be of equal or unequal lengths. A EnFret 40 may overlap another EnFret 40. EnFrets 40 do not have to be contiguous with respect to the entirely of data in the target data 11. EnFrets 40 may be discontiguous. For some target data, the final EnFret 40 can be truncated. The EnFrets 40 do not have to be on the same structure boundaries as the target data 11 structure 34. The present invention does not even have to know the target data 11 structure 34. This allows the present invention to process opaque target data 11. Opaque target data 11 is target data 11 lacking a defined structure 34.

One embodiment of the present invention is designed to allow the editing of target data 11, such as an mp3 file, where the resulting edited file will still generate measurements of order 16 that fall within the corresponding ranges of order 23 as long as the underlaying structure 34 is unchanged. However, if the underlaying structure 34 is changed, as would be the case if the mp3 files were processed by an encryption program, then at least one of the generated measurements of order 16 will fall outside the corresponding ranges of order 23 and an indication will be made. The present invention entropy will operate correctly even when the target data 11 structure 34 includes some fields that are encrypted or compressed, both of which result in high entropy metrics. This is because the target data 11 structures 34 that include encrypted or compressed fields, still require data headers that produce lower entropy metrics. Examples of target data 11 that include compressed or encrypted fields include mp3 and jpeg files, both of which use various compression methods within their structure, and pdf files which can optionally include encrypted data. However, when these files are subject to bulk encryption, all of the data, including the header data becomes encrypted, resulting in low measurements of order 16 for EnFrets 40 that previously exhibited higher measurements of order 16.

In one embodiment, when target data 11 is arranged in a first structure 34A and is processed into a second target data 11B and that the second target data 11B is arranged in the same first data structure 34A as the target data 11, the order measurement sensor 14 measuring the EnFrets 40 within the second target data 11B will produce measurements of order 16 that are within the range of order 23 associated with the second target data 11B. When the second target data 11B replaces the target data 11 in the data repository 12, the updated target data 11, the order measurement sensor 14 measuring the EnFrets 40 within the new, updated target data 11 will produce measurements of order 16 that are within the range of order 23 associated with the updated target data 11. In this way, target data 11 of one format can be processed or edited without triggering the detection of tampering.

In one embodiment, when target data 11 is arranged in a first structure 34A and is processed into a second target data 11B and that the second target data 11B is arranged in a second structure 34B, the order measurement sensor 14 measuring the EnFrets 40 within the second target data 11B will produce at least one measurement of order 16 will be outside of the range of order 23 associated with the second target data 11B. When the second target data 11B replaces the target data 11 in the data repository 12, the updated target data 11, the order measurement sensor 14 measuring the EnFrets 40 within the new, updated target data 11 will produce at least one measurement of order 16 that is outside of the range of order 23 associated with the new updated target data 11. In this way, when target data 11 of one format is processed into a second format, it will be detected as tampering.

In one embodiment, the repository of data 12 includes encrypted data.

In one embodiment, the repository of data 12 includes compressed data.

When generating the pre-determined levels of order 22 and their corresponding ranges of order 23, target data 11 from similar target data 11 types are analyzed together. When metadata about the target data 11 is available, it can be used to classify target data 11 types and group them appropriately. Examples of metadata that can be used to classify and group target data 11 includes the file name extension, the source location of the file, and the target data 11 length. Combinations of metadata can also be used. For example, all files ending with .mp3 can be evaluated together to generate pre-determined levels of order 22 and their corresponding ranges of order 23 for mp3 files. Care must be taken to verify that the files have not been corrupted and do not have a different target data 11 structure 34. Including corrupted data in the pre-determined levels of order 22 and their corresponding ranges of order 23 calculations may have adverse effects. For target data 11 that do not have an extension, the target data 11 location or file location can provide a useful classification method. The target data 11 length can also be useful in classifying, qualifying, or disqualifying the classification and grouping of target data 11.

V. Examples of Implementations of the Invention

The various embodiments of the present invention can be used in a variety of ways. It can be used as a memory and file scanner, scanning and detecting anomalies where target data 11 of scanned files and memory region whose measurements of order falls outside of the pre-determined levels of order 22 and their corresponding ranges of order 23 and alerting the system.

In one embodiment of the present invention, anomalies where target data 11 of scanned files and memory region whose measurements of order falls outside of the pre-determined levels of order 22 are detected. These detections are written in a random access memory and/or in a storage medium, and change the state of components within the device.

The present invention can also be used in a filesystem or memory monitor in real time to detect anomalies where a file or memory region is being written whose target data 11 measurement of order 16 outside of the pre-determined levels of order 22 and their corresponding ranges of order 23. Upon detecting the anomaly, the filesystem or memory monitor can quarantine the file or memory write, or block the file or memory write, in addition alerting the system.

In the present application, a quarantined file is a copy of the original, unmodified file. This enables a data tampering detection mechanism to preserve the original file so that it can be restored without requiring decryption.

In one embodiment of the present invention, the library 20 resides within the memory 80.

In one embodiment of the present invention, the library 20 resides within the storage 88.

In one embodiment, the target data 11 is accessed using the input output interface 86.

In one embodiment, the indicator 24 indicates the detection tampering using the input output interface 86.

In one embodiment, the indicator 24 communicates with the access manager 26 using the input output interface 86.

In one embodiment, the indicator 24 communicates with the false positive reduction evaluator 28 using the input output interface 86.

In one embodiment, the order measurement sensor 14 operates using the CPU 84.

In one embodiment, the comparator 18 operates using the CPU 84.

In one embodiment, the indicator 24 operates using the CPU 84.

VI. Benefits of the Invention

The detection of malware, including ransomware has always been a game of evolving offensive and defensive capabilities. When a new offensive technology, in this case ransomware, is used, new defensive technologies are developed to combat their detection and use. Ransomware technologies continue to evolve, primarily using previously unknown zero-day methods to obtain the privileges necessary to perform data tampering and encryption. Some detection methodologies incorporate CPU usage monitoring in their detection; data encryption is computationally expensive and high CPU unitization for long periods of time may be an indicator of malware or ransomware activity. Recent advances in ransomware attempts to combat this approach be encrypting only portions of the ransomed data. By encrypting stripes through the target data, the target data is damaged, and the ransomware utilizes only a small fraction of the CPU processing previously used when encrypting the entire target data.

The configuration and use of multiple EnFrets 40 is key to detecting unauthorized data tampering, especially when malware strategies, and their corresponding detection and mitigation are evolving. The configuration of the multiple EnFrets 40 may be different for each type of file or target data location being evaluated, and for different strains of ransomware. In the above example where only portions of the target data is being encrypted, the configuration of EnFrets 40 can be configured to match and detect the encrypted data stripes.

Each EnFret 40 can be configured to evaluate a portion of the target data 11. The configuration options for an individual EnFret 40 includes the start and end of the data within the target data 11, and the algorithm used to calculate the measurement of order 16. Multiple EnFrets 40 can be configured to be adjacent to each other with respect to the target data 11, as shown in FIG. 15 with EnFret A 40A and EnFret B 40B. Multiple EnFrets 40 can be configured to be discontiguous each other with respect to the target data 11, as show in FIG. 15 with EnFret C 40C and EnFret B 40B. Multiple EnFrets 40 can be configured to overlapp each other with respect to the target data 11, as shown in FIG. 15 with EnFret D 40D and EnFret E 40E. Multiple EnFrets 40 can be configured to be of different sizes, as shown in FIG. 15 with EnFret A 40A and EnFret B 40B. EnFrets 40 can also be configured to use a specific order measurement algorithm.

In one embodiment of the present invention, each EnFret 40 man be configured to evaluate a portion of the target data 11. These configurations are written in a random access memory and/or in a storage medium, and change the state of components within the device.

The development of unique configurations of EnFrets 40 to detect various forms of data tampering, unauthorized data encryption, and ransomware operation is a continuous activity. As new ransomware strains and variants are discovered, the corresponding EnFret 40 configurations will be added to the plurality of predetermined EnFret configurations 42P. The plurality of predetermined EnFret configurations 42P is used by the order measurement sensor 14 to produce a plurality of configured EnFrets 44P which are subsequently used to make a plurality of measurements of order 16P of the target data 11. It is this flexibility of the configuration of the EnFrets 40 that makes the present invention uniquely suited to the detection of ransomware and unauthorized encryption while maintaining a low false positive rate and a low false negative rate. Reliably detecting ransomware performing unauthorized encryption of target data 11 does not work without the use of multiple configurable EnFrets 40.

VII. Definition of Terms

The definitions presented in this section are not intended to limit the scope of the meaning or applicability of any term, and is intended to provide a convenient alphabetically-ordered reference for the reader.

Analytics—A system or apparatus that takes sensor or data inputs from one or more sources to produce a coordinated view of activity. Analytics may employ “big data” and “artificial intelligence” techniques. Analytics can provide situational awareness, baseline and out of parameter behavioral indications, security anomaly detection and other multi variate analysis.

ApEn—Approximate Entropy, an algorithm that measures the logarithmic probability that nearby pattern runs remain close in the next incremental comparison. ApEn quantifies the concept of variable complexity without the difficulties of exact statistics of regularity. The main idea behind ApEn’s development was that it is not an algorithm to entirely determine the dynamics of a system. Instead, it is an appropriate algorithm for classifying systems and studying the evolution of its complexity: it is not necessary to completely reconstruct the dynamics of the system to classify it.

Arithmetic Mean Test—The result of summing all the data bytes and dividing by the number of data bytes. If the data values are close to random, this should be about 127.5. If the mean departs from this value, the values are consistently high or low.

Chi-Squared Test—The chi-square test is a commonly used test for the randomness of data, and is extremely sensitive to errors in pseudorandom sequence generators. The chi-square distribution is calculated for a stream of bytes and expressed as an absolute number and a percentage which indicates how frequently a truly random sequence would exceed the value calculated.

Compression—Data compressions, is the process of encoding information using fewer bits than the original representation. Any particular compression is either lossy or lossless. Lossless compression reduces bits by identifying and eliminating statistical redundancy. No information is lost in lossless compression. Lossy compression reduces bits by removing unnecessary or less important information.

CPU—Central Processing Unit. A set of circuits that processes CPU instructions.

CPU Instructions—A set of instructions that controls the operation of a CPU.

Cross-ApEn—An algorithm that measures the asynchrony between two different time series. Conceptually, the formulation is very similar to ApEn, with the peculiarity that now we compare the blocks of a series with the blocks of the other series, instead of doing it with the same series. A low number of coincidences imply a high value of cross-ApEn, indicating asynchrony. If the value of cross-ApEn is low, then the two series are more concordant. The idea behind cross-ApEn is the same as before; it is not necessary to model the system in order to discriminate it satisfactorily.

Cross-Samp-En—An algorithm that measures the asynchrony between two different time series, based on the Samp-En algorithm. Conceptually, the formulation is very similar to SampEn. The most remarkable feature of this statistic is its independence of directionality, i.e., it does not matter which series is the template and which one is the target since the results are the same.

Data Compression—The process of encoding information using fewer bits than the original representation. Any particular compression is either lossy or lossless. Lossless compression reduces bits by identifying and eliminating statistical redundancy. No information is lost in lossless compression. Lossy compression reduces bits by removing unnecessary or less important information. In reducing statistical redundancy, measurements of order of compressed data is generally lower than uncompressed data.

Data Encryption—The process of encoding information. This process converts the original representation of the information, known as plaintext, into an alternative form known as ciphertext. Ideally, only authorized parties can decipher a ciphertext back to plaintext and access the original information. Encryption does not itself prevent interference but denies intelligible content to a would-be interceptor. For technical reasons, an encryption scheme usually uses a pseudo-random encryption key generated by an algorithm. It is possible to decrypt the message without possessing the key but, for a well-designed encryption scheme, considerable computational resources and skills are required. An authorized recipient can easily decrypt the message with the key provided by the originator to recipients but not to unauthorized users. Encryption schemes are designed to make the resulting ciphertext appear as random data. Measurements of order of encrypted data is generally much lower than unencrypted data.

Data Structure—A data structure is a data organization, management, and storage format that is usually chosen for efficient access to data. More precisely, a data structure is a collection of data values, the relationships among them, and the functions or operations that can be applied to the data, i.e., it is an algebraic structure about data. Data structures can be analogous to database records and their fields.

EnFret—An EnFret is the data for which a measurement of order is made.

Filesystem—A file system or filesystem is a method and data structure that the operating system uses to control how data are stored and retrieved. Without a filesystem, data placed in a storage medium would be one large body of data with no way to tell where one piece of data stopped and the next began, or where any piece of data was located when it was time to retrieve it. By separating the data into pieces and giving each piece a name, the data are easily isolated and identified. Taking its name from the way a paper-based data management system is named, each group of data is called a "file". The structure and logic rules used to manage the groups of data and their names is called a "filesystem."

Field—In computer science, data that has several parts, known as a record, can be divided into fields (data fields). Relational databases arrange data as sets of database records, so called rows. Each record consists of several fields; the fields of all records form the columns. Examples of fields: name, gender, hair color. A record can be analogous to a data structure and fields are analogous to objects within a data structure.

Input Output Interface—An electronic circuit that communicates with other electronic circuits in accordance to a specification.

Measurement of Order—A measurement of Shannon entropy or similar measurement such as the chi-squared test, serial byte correlation, arithmetic mean test, and Monte Carlo value for Pi.

Memory—An electronic circuit which allows for the temporal storage of data.

Monte Carlo value for Pi—Each successive sequence of six bytes is used as 24 bit X and Y coordinates within a square. If the distance of the randomly-generated point is less than the radius of a circle inscribed within the square, the six-byte sequence is considered a "hit". The percentage of hits can be used to calculate the value of Pi. For very large streams (this approximation converges very slowly), the value will approach the correct value of Pi if the sequence is close to random.

Query—A request for a record from a storage or database device.

Repository of Data—A device that contains data. The data may be contained in memory or other non-persistent storage, in persistent storage such as a disk drive or solid state disk, or any other media form.

SampEn—Sample Entropy, an algorithm that measures the logarithmic probability that nearby pattern runs remain close in the next incremental comparison, but does not depend on the length of the data series.

Serial Byte Correlation—This measures the extent to which each byte depends upon the previous byte. For random sequences, this value (which can be positive or negative) will, of course, be close to zero. A non-random byte stream such as a C program will yield a serial correlation coefficient on the order of 0.5. Wildly predictable data such as uncompressed bitmaps will exhibit serial correlation coefficients approaching 1.

Shannon Entropy—In information theory, the Shannon Entropy or entropy of a random variable is the average level of "information", "surprise", or "uncertainty" inherent to the variable's possible outcomes. Shannon entropy is a way of measuring the degree of unexpectedness or unpredictability of a random variable. For example rolling a die has higher entropy than flipping a coin because the die has more possible outcomes making it harder to predict.

Storage—A technology or device which allows for the reading and writing of data that persists over time. Volatile storage fails after power is removed. Non-volatile storage does not require power to maintain its storage capabilities. Dynamic Random Access Memory is an example of volatile storage. FLASH memory and disk drives are examples of non-volatile storage.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for a Data Tampering Defense System that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Electronic Device
10D Electronic Storage Device
11 Target Data
11B Second Target Data
12 Repository of Data
13 Connection
14 Order measurement sensor
16 Measurement of Order
16P Plurality of Measurements of Order
18 Comparator
19 Indication of Data Tampering
20 Library
22 Pre-determined Level of Order
22P Plurality of Pre-determined Levels of Order
23 Range of Order
23P Plurality of Range of Order
24 Indicator
25 Alarm
26 Access Manager
28 False Positive Reduction Evaluator
34 Structure
34A First Structure
34B Second Structure
40 EnFret
40A EnFret A
40B EnFret B
40C EnFret C
40D EnFret D
40E EnFret E
40P Plurality of EnFrets
42 Predetermined EnFret Configuration
42P Plurality of Predetermined EnFret Configurations
44 Configured EnFret
44P Plurality of Configured EnFrets
50 Flowchart 1, Step 1
52 Flowchart 1, Step 2
54 Flowchart 1, Step 3
56 Flowchart 1, Step 4
58 Flowchart 1, Step 5
60 Flowchart 2, Step 1
62 Flowchart 2, Step 2
70 Flowchart 3, Step 1
72 Flowchart 3, Step 2
74 Flowchart 3, Step 3
76 Flowchart 3, Step 4
80 Memory
82 CPU Instructions
84 CPU
86 Input Output Interface
88 Storage

What is claimed is:

1. An apparatus for detecting tampering comprising:
an electronic device (10);
an electronic storage device; a repository of data (12); said repository of data (12) being contained within said electronic storage device;
a plurality of target data (11); said plurality of target data (11) being stored in said repository of data (12);
a library (20); said library storing a plurality of predetermined levels of order (22), a plurality of ranges of order (23), and a plurality of predetermined EnFret configurations;
an order measurement sensor (14); said order measurement sensor (14) calculating the order of a repository of data (12); said order measurement sensor (14) generally continuously sensing a plurality of measurements of order (16) in said repository of data (12);
said order measurement sensor (14) calculating said measurement of order (16) across multiple portions of the target data (11), producing said plurality of measurements of order (16P):
a plurality of configured EnFrets (44P); some of different ones of said plurality of EnFrets being chosen to produce different results;
each of said plurality of configured EnFrets (44P) including the start and end of the data within said target data (11);
each of said plurality of configured EnFrets (44P) describing a portion of said target data (11) that is included in each of said measurement of order (16), and the algorithm used to produce said measurement of order (16);
different ones of said plurality of EnFrets being chosen to produce different results;
said order measurement sensor (14) using said plurality of predetermined EnFret configurations (42P) to produce said plurality of configured EnFrets (44P); each of said plurality of configured EnFrets (44P) contained within said plurality of target data (11); said plurality of measurements of order (16) are measured over said plurality of configured EnFrets (44P);
a comparator (18); said comparator (18) being connected to said order measurement sensor (14); said comparator (18) being connected to said library (20); and
said comparator (18) comparing the difference between said plurality of pre-determined levels of order (22) to said plurality of measurements of order (16) of said repository data (12), which compares said difference to said plurality of ranges of order (23), and which signals when at least one of said ranges of order (23) is exceeded;
an indicator (24); said indicator (24) being connected to said comparator (18); and said indicator (24) indicating the detection of data tampering;
said indicator (24) indicating that said target data (11) may have been encrypted.

2. An apparatus as recited in claim 1, further comprising:
an access manager (26);
said access manager (26) being connected to said indicator (24);
said access manager (26) for preventing further activity after a changed measurement of order (16) of said repository of data (12) is indicated.

3. An apparatus as recited in claim 1, in which:
said tampering is the unauthorized encryption of said plurality of target data (11).

4. An apparatus as recited in claim 1, further including:
a false positive reduction evaluator (28);
said false positive reduction evaluator (28) being connected to said indicator (24);
said false positive reduction evaluator (28) for reducing false positive errors produced by said order measurement sensor (14), said comparator (18), said library (20), and said indicator (24).

5. An apparatus as recited in claim 1, further including:
a false positive reduction evaluator (28);

said false positive reduction evaluator (28) being connected to said indicator (24); and said false positive reduction evaluator (28) includes a mechanism for performing recognition of computing device software when a changed measurement of order (16) of said repository of data (12) is detected.

6. An apparatus as recited in claim 1, further including:

a false positive reduction evaluator (28);

said false positive reduction evaluator (28) being connected to said indicator (24); and said false positive reduction evaluator (28) includes a mechanism for performing behavioral analysis of the software when a changed measurement of order (16) of said repository of data (12) is detected.

7. An apparatus as recited in claim 1, in which the configuration of two of said plurality of configured EnFrets (44P) are unique to a specific variant of ransomware.

8. An apparatus as recited in claim 1, in which the configuration of two of said plurality of configured EnFrets (44P) are of unequal length.

9. An apparatus as recited in claim 1, in which the configuration of two of said plurality of configured EnFrets (44P) overlap within said plurality of target data (11).

10. An apparatus as recited in claim 1, in which the configuration of two of said plurality of configured EnFrets (44P) are discontiguous with respect to said plurality of target data (11).

11. An apparatus as recited in claim 1, in which when said plurality of target data (11) arranged in a first structure (34A) is processed into a second plurality of target data (11B) arranged in said first structure (34A), and said second plurality of target data (11B) replacing said plurality of target data (11) in said repository of data (12), said order measure sensing said repository of data (12) does not cause said indicator (24) to indicate the detection of unauthorized encryption.

12. An apparatus as recited in claim 1, in which when said plurality of target data (11) arranged in a first structure (34A) is processed into a second plurality of target data (11B) arranged in a second structure (34B), and said second plurality of target data (11B) replacing said plurality of target data (11) in said repository of data (12), said order measure sensing said repository of data (12) caused said indicator (24) to indicate the detection of unauthorized encryption.

13. An apparatus as recited in claim 1, in which said comparator (18) does not have knowledge of said first structure (34A).

14. An apparatus as recited in claim 1, in which said repository of data (12) is on a communications medium.

15. An apparatus as recited in claim 1, in which said repository of data (12) includes compressed data.

16. An apparatus as recited in claim 1, in which said repository of data (12) includes encrypted data.

17. An apparatus as recited in claim 1, in which said order measurement sensor (14), said comparator (18), and said library (20) prevent the unauthorized encryption of said target data (11).

18. An apparatus as recited in claim 1, in which said order measurement sensor (14), said comparator (18), and said library (20) detect the unauthorized encryption of said target data (11).

19. An apparatus as recited in claim 1, in which said pre-determined levels of order (22) include the location within a filesystem of said plurality of target data (11).

20. An apparatus as recited in claim 1, in which said plurality of pre-determined levels of order (22) each include metadata of said plurality of target data (11).

21. An apparatus as recited in claim 1, in which said plurality of pre-determined levels of order (22) each include the file extension of said plurality of target data (11).

22. An apparatus as recited in claim 1, in which said plurality of pre-determined levels of order (22) each include the length of said plurality of target data (11).

23. An apparatus as recited in claim 2, in which said access manager (26) blocks said plurality of target data (11) from said repository of data (12).

24. An apparatus as recited in claim 2, in which said access manager (26) quarantines said plurality of target data (11) from said repository of data (12).

25. An apparatus as recited in claim 1, in which said plurality of pre-determined levels of order (22) includes a range of order (23).

26. An apparatus as recited in claim 24, in which said range is determined by computing the standard deviation of said plurality of pre-determined levels of order (22).

27. A method for detecting tampering comprising the steps of:

providing a repository of data (12);

providing a plurality of target data (11); said plurality of target data (11) residing within said repository of data (12);

producing a plurality of configured EnFrets (44P); some of different ones of said plurality of EnFrets being chosen to produce different results:

each of said plurality of configured EnFrets (44P) including the start and end of the data within said target data (11);

each of said plurality of configured EnFrets (44P) describing a portion of said target data (11) that is included in each of said measurement of order (16), and the algorithm used to produce said measurement of order (16);

different ones of said plurality of EnFrets being chosen to produce different results;

providing an order measurement sensor (14); said order measurement sensor (14) for generally continuously sensing measurements of order (16) of said repository of data (12);

providing a library (20); said library providing a plurality of pre-determined levels of order (22P) and a plurality of ranges of order (23);

providing a comparator (18); said comparator (18) connected to said order measurement sensor (14); said comparator (18) for comparing said measurements of order (16) to said plurality of pre-determined levels of order (22P);

providing an indicator (24); said indicator (24) connected to said comparator (18); said indicator (24) for providing an indication of data tampering (19);

sensing by said order measurement sensor (14) said plurality of measurements of order (16) of said plurality of target data (11);

conveying by said order measurement sensor (14) said plurality of measurements of order (16) to said comparator (18);

said order measurement sensor (14) calculating said measurement of order (16) across multiple portions of the target data (11), producing said plurality of measurements of order (16P);

measuring by said comparator (18) differences between said plurality of measurements of order (16) and said plurality of pre-determined levels of order (22P);

determining by said comparator (18) that said differences are greater than at least one of said plurality of ranges of order (23P);

said comparator (18) compares the difference between said plurality of pre-determined levels of order (22) to said plurality of measurements of order (16) in said repository data (12), compares said difference to said plurality of ranges of order (23), and signals when at least one of said ranges of order (23) is exceeded:

conveying by said comparator (18) said difference between said plurality of measurements of order (16) and said plurality of pre-determined levels of order (22P) to said indicator (24); and said indicator (24) indicating that said target data (11) may have been encrypted;

indicating by said indicator (24) an indication of data tampering (19).

28. The method as recited in claim 27, including the additional steps of:

providing an access manager (26); said access manager (26) connected to said indicator (24); said access manager (26) for controlling access to said repository of data (12);

receiving by said access manager (26) said indication of data tampering (19) from said indicator (24); and using said access manager (26) to control activity in said repository of data (12).

29. A method as recited in claim 27, in which said tampering is a ransomware attack.

30. A method as recited in claim 27, including the additional steps of:

providing a false positive reduction evaluator (28); said false positive reduction evaluator (28) being connected to said indicator (24); said false positive reduction evaluator (28) performing software recognition when a changed level of order of said repository of data (12) is detected.

31. A method as recited in claim 30, in which said false positive reduction evaluator (28) reduces false positives in the detection of tampering.

32. A method as recited in claim 27, including the additional steps of:

said library (20) producing a plurality of predetermined EnFret configurations (42P);

producing a plurality of configured EnFrets (44P) by configuring a plurality of EnFrets (40P) using said plurality of predetermined EnFret configurations (42P);

each of said plurality of configured EnFrets (44P) being contained within said plurality of plurality of target data (11); and each of said plurality of configured EnFrets (44P) producing said plurality of measurements of order (16P).

33. A method as recited in claim 32, in which a plurality of said plurality of configured EnFrets (44P) are of unequal length.

34. A method as recited in claim 32, in which a plurality of said plurality of configured EnFrets (44P) overlap within said plurality of target data (11).

35. A method as recited in claim 32, in which a plurality of said plurality of configured EnFrets (44P) are discontiguous with respect to said plurality of target data (11).

36. A method as recited in claim 27, including the additional steps of:

providing a second plurality of target data 11B;

when said plurality of target data (11) arranged in a first structure (34A) is processed into a said second plurality of target data (11B) arranged in said first structure (34A), and said second plurality of target data (11B) replacing said plurality of target data (11) in said repository of data (12), said order measure sensing said repository of data (12) does not cause said indicator (24) to indicate the detection of tampering.

37. A method as recited in claim 27, including the additional steps of:

providing a second plurality of target data (11B);

when said plurality of target data (11) arranged in a first structure (34A) is processed into said second plurality of target data (11B) arranged in a second structure (34B), and said second plurality of target data (11B) replacing said plurality of target data (11) in said repository of data (12), said order measure sensing said repository of data (12) caused said indicator (24) to indicate the detection of tampering.

38. A method as recited in claim 27, in which said order measurement sensor (14) does not have knowledge of said first structure (34A).

39. A method as recited in claim 32, in which the configuration of at least two of said plurality of configured EnFrets (44P) are unique to a specific variant of ransomware.

40. A method as recited in claim 27, in which said repository of data (12) includes compressed data.

41. A method as recited in claim 27, in which said repository of data (12) includes encrypted data.

42. A method as recited in claim 27, in which said plurality of pre-determined levels of order (22P) include the location within a filesystem of said plurality of target data (11).

43. A method as recited in claim 27, in which said plurality of pre-determined levels of order (22P) include metadata of said plurality of target data (11).

44. A method as recited in claim 27, in which said plurality of pre-determined levels of order (22P) include the file extension of said plurality of target data (11).

45. A method as recited in claim 27, in which said plurality of pre-determined levels of order (22P) include the length of said plurality of target data (11).

46. A method as recited in claim 28, including the additional step of:

using said access manager (26) to block said plurality of target data (11) from entering said repository of data (12).

47. A method as recited in claim 28, including the additional step of:

quarantining by said access manager (26) said plurality of target data (11) from said repository of data (12).

48. A method as recited in claim 27, in which said plurality of ranges of order (23P) is determined by calculating the standard deviation of said plurality of pre-determined levels of order (22).

49. A product-by-process comprising:

an electronic device (10); said electronic device (10) including a library (20), an order measurement sensor (14), a comparator (18), and an indicator (24);

using said library (20) to store a plurality of pre-determined levels of order (22), a plurality of ranges of order (23), and a plurality of predetermined EnFret configurations (42P);

an electronic storage device (10D); said electronic storage device (10D) including a repository of data (12) for storing a plurality of target data (11);

producing a plurality of configured EnFrets (44P); some of different ones of said plurality of EnFrets being chosen to produce different results;

using said order measurement sensor (14) within said electronic device (10) to configure a plurality of configured EnFrets (44P) from said plurality of predetermined EnFret configurations (42P);

using said order measurement sensor (14) to generally continuously evaluate the order of said repository of data (12) by creating a plurality of measurements of order (16) which are measured over said plurality of configured EnFrets (44P);

said order measurement sensor (14) calculating said measurement of order (16) across multiple portions of the target data (11), producing said plurality of measurements of order (16P);

each of said plurality of configured EnFrets (44P) including the start and end of the data within said target data (11);

each of said plurality of configured EnFrets (44P) describing a portion of said target data (11) that is included in each of said measurement of order (16), and the algorithm used to produce said measurement of order (16);

different ones of said plurality of EnFrets being chosen to produce different results;

using said comparator (18) which is connected to said order measurement sensor (14) and to said library (20) to generally continuously measure the difference between said plurality of pre-determined levels of order (22) to said plurality of measurements of order (16) in said repository data (12), to compare said difference to said plurality of ranges of order (23), and to indicate when at least one of said ranges of order (23) is exceeded; and said comparator (18) for generally continuously measuring compares the difference between said plurality of pre-determined levels of order (22) to said plurality of measurements of order (16) in said repository data (12), for comparing compares said difference to said plurality of ranges of order (23), and for indicating signals when at least one of said ranges of order (23) is exceeded;

using said indicator (24) which is connected to said comparator (18) to indicate the detection of tampering to endow said electronic device (10) with reliable protection, at an acceptable rate of false positives, against a ransomware attack;

said indicator (24) indicating that said target data (11) may have been encrypted.

* * * * *